US011134432B2

United States Patent
Ioffe et al.

(10) Patent No.: US 11,134,432 B2
(45) Date of Patent: Sep. 28, 2021

(54) SYSTEM INFORMATION ACQUISITION ENHANCEMENTS FOR WIRELESS DEVICES

(71) Applicant: Apple Inc., Cupertino, CA (US)

(72) Inventors: Anatoliy Ioffe, Beaverton, OR (US); Debdeep Chatterjee, San Jose, CA (US); Marta Martinez Tarradell, Munich (DE); Andrey Chervyakov, Nizhny Novgorod (RU); Jie Cui, Santa Clara, CA (US); Seau S. Lim, Swindon (GB); Qiaoyang Ye, San Jose, CA (US); Yang Tang, San Jose, CA (US); Seunghee Han, San Jose, CA (US); Shuang Tian, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 154 days.

(21) Appl. No.: 16/480,837

(22) PCT Filed: Feb. 2, 2018

(86) PCT No.: PCT/US2018/016613
§ 371 (c)(1),
(2) Date: Jul. 25, 2019

(87) PCT Pub. No.: WO2018/144836
PCT Pub. Date: Aug. 9, 2018

(65) Prior Publication Data
US 2020/0107247 A1 Apr. 2, 2020

Related U.S. Application Data

(60) Provisional application No. 62/454,461, filed on Feb. 3, 2017, provisional application No. 62/454,671, filed on Feb. 3, 2017.

(51) Int. Cl.
*H04W 48/12* (2009.01)
*H04W 4/70* (2018.01)
(Continued)

(52) U.S. Cl.
CPC ............. *H04W 48/12* (2013.01); *H04W 4/70* (2018.02); *H04W 74/006* (2013.01); *H04W 74/0833* (2013.01); *H04W 76/10* (2018.02)

(58) Field of Classification Search
CPC ....... H04W 48/12; H04W 4/70; H04W 4/027; H04W 4/06; H04W 4/21; H04W 4/80;
(Continued)

(56) References Cited

U.S. PATENT DOCUMENTS

2013/0044678 A1* 2/2013 Qu ..................... H04W 52/244
370/328
2015/0043420 A1 2/2015 Xiong et al.
(Continued)

FOREIGN PATENT DOCUMENTS

WO WO-2017019133 A1 2/2017
WO WO-2018144836 A1 8/2018

OTHER PUBLICATIONS

"Discussion on SI acquisition delay for NB-IoT", Intel Corporation, R4-1609112, 3GPP RAN4 #81, (4 pgs), Nov. 2016.
(Continued)

*Primary Examiner* — Ricardo H Castaneyra
(74) *Attorney, Agent, or Firm* — Kowert, Hood, Munyon, Rankin & Goetzel, P.C.

(57) ABSTRACT

An apparatus of a user equipment (UE) includes processing circuitry configured to decode a master information block (MIB) using a set of physical broadcast channel (PBCH) symbols received within a downlink frame to obtain system frame number (SFN) information. The downlink frame includes multiple copies of the PBCH symbols within at least three subframes of the downlink frame. A system information block (SIB) may be decoded based on the SFN information, to obtain uplink channel configuration information. Random access channel (RACH) procedure may be
(Continued)

performed with a base station (BS) based on the uplink channel configuration information, to obtain an uplink resource assignment. A connection setup completion message can be encoded for transmission to the BS using the uplink resource assignment. The set of PBCH symbols can include a set of four legacy PBCH symbols.

20 Claims, 23 Drawing Sheets

(51) Int. Cl.
*H04W 76/10* (2018.01)
*H04W 74/00* (2009.01)
*H04W 74/08* (2009.01)

(58) Field of Classification Search
CPC ........... H04W 74/006; H04W 74/0833; H04W 74/008; H04W 76/10; H04L 5/0053; H04L 5/0094; H04L 5/005; Y02D 30/70
See application file for complete search history.

(56) References Cited

U.S. PATENT DOCUMENTS

| | | | |
|---|---|---|---|
| 2015/0078300 A1* | 3/2015 | Xu | H04W 52/241 370/329 |
| 2016/0242211 A1 | 8/2016 | Chung et al. | |
| 2016/0295345 A1 | 10/2016 | Oh | |
| 2017/0264419 A1* | 9/2017 | Fakoorian | H04L 1/1861 |
| 2017/0290001 A1* | 10/2017 | Axmon | H04W 72/0446 |
| 2018/0049181 A1* | 2/2018 | Wu | H04W 48/12 |

OTHER PUBLICATIONS

"International Application Serial No. PCT/US2018/016613, International Search Report dated May 11, 2018", 3 pgs.
"International Application Serial No. PCT/US2018/016613, Written Opinion dated May 11, 2018", 9 pgs.
"LS reply on FeMTC VoLTE enhancements", 3GPP RAN WG2, R2-168974, (Nov. 2016), 1 pg.
"LS to RAN1, RAN2 on eNB-IoT SI acquisition delay", 3GPP RAN WG4, R4-1611002, (Nov. 2016), 2 pgs.
"LS to RAN1, RAN2 on FeMTC SI acquisition delay", 3GPP RAN WG4, R4-1611001, (Nov. 2016), 1 pg.
"MIB acquisition delay simulation results for eMTC RRM", Intel Corporation, R4-1609113, 3GPP RAN4 #81., (Nov. 2016), 6 pgs.
"NPBCH Demodulation Performance", Intel Corporation, R4-1609109, 3GPP RAN4 #81., (Nov. 2016), 4 pgs.
"Revised WID for Further Enhanced MTC for LTE", Ericson, Intel Corporation, Qualcomm, ZTE, Huawei, RP-162520, 3GPP RAN #74., (6 pgs), Dec. 2016.
"Revised work item proposal: Enhancements of NB-IoT", Huawei, 3GPP RAN #73, RP-161901, (Sep. 2016), 8 pgs.
"Simulation summary of NB-IoT UE demodulation requirements", Ericsson, 3GPP, R4-1610553, RAN4 #81, (Nov. 2016), 2 pgs.
"Simulations results for MPBCH demodulation", Intel Corporation, R4-1609114,3GPP RAN4 #81., (Nov. 2016), 5 pgs.
"Summary of eMTC MIB acquisition delay simulation results", Intel Corporation, R4-1610652, 3GPP RAN4 #81., (Nov. 2016), 8 pgs.
"Summary of NB-IoT SI acquisition delay simulation results", Intel Corporation, R4-1610547, 3GPP RAN4 #81., (Nov. 2016), 4 pgs.
Ericsson, "System information for low complexity and extended coverage", R2-1700478, 3GPP TSG-RAN WG2 NR Ad Hoc, Spokane, USA, (Jan. 7, 2017).

* cited by examiner

FIG. 8

| SYMB: | 0 | 1 | 2 | 3 | 4 | 5 | 6 | 0 | 1 | 2 | 3 | 4 | 5 | 6 |
|---|---|---|---|---|---|---|---|---|---|---|---|---|---|---|
| REPETITION INDICES: | X | X | X | R7(0) | R7(1) | R7(2) | R7(3) | R6(0) | R6(1) | R6(2) | R6(3) | R8(0) | R8(1) | R8(2) |

SYSTEM INFORMATION ACQUISITION ENHANCEMENTS FOR WIRELESS DEVICES

PRIORITY CLAIM

This application is a U.S. National Stage Filing under 35 U.S.C. 371 from International Application No. PCT/US2018/016613, Filed on Feb. 2, 2018, and published as WO 2018/144836 on Aug. 9, 2018, which claims the benefit of priority to U.S. Provisional Patent Application Ser. No. 62/454,461, filed Feb. 3, 2017, and entitled "SYSTEM INFORMATION ACQUISITION ENHANCEMENTS FOR FEMTC," and U.S. Provisional Patent Application Ser. No. 62/454,671, filed Feb. 3, 2017, and entitled "SYSTEM INFORMATION ACQUISITION ENHANCEMENTS FOR. ENB-IOT," all of which are incorporated herein by reference in their entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to system acquisition enhancements in Machine-Type Communications (MTC) networks, Enhanced MTC (eMTC) networks, and Further Enhanced MTC (FeMTC) networks. Additional aspects are directed to system acquisition enhancements for Internet-of-Things (IoT) and Enhanced Narrowband (NB) IoT (eNB-IoT) networks.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments.

LTE and LTE-Advanced are standards for wireless communications of high-speed data for user equipment (UE) such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

There are emerging interests in the operation of LTE systems in the unlicensed spectrum. As a result, an important enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system. Rel-13 LAA system focuses on the design of downlink operation on unlicensed spectrum via CA, while Rel-14 enhanced LAA (eLAA) system focuses on the design of uplink operation on unlicensed spectrum via CA.

The use of networked UEs using 3GPP UE systems has increased in areas of home and work life. Fifth generation (5G) wireless systems are forthcoming, and are expected to enable even greater speed, connectivity, and usability. Next generation 5G networks are expected to increase throughput, coverage, and robustness. As current cellular network frequency is saturated, high frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments. Further enhanced operation of LTE systems in the licensed as well as unlicensed spectrum is expected in future releases and 5G systems.

Machine Type Communications (MTC), such as Machine-to-Machine (M2M) communications, as well as IoT communications, represent a significant growth opportunity for 3GPP ecosystems. With proliferation of the wireless networks, there is an accelerated push towards connected, smart physical objects, such as wireless sensors, smart meters, dedicated microprocessors, etc., that span different ecosystems with diverse business models. In this regard, various data delivery mechanisms can be deployed within a dense communication environment.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

FIG. 8 illustrates an example downlink frame portion for communicating PBCH symbols with enhanced PBCH repetitions, in accordance with some aspects.

FIG. 11 illustrates an example downlink frame portion for communicating PBCH symbols with enhanced PBCH repetitions in a time division duplex (TDD) communication system, in accordance with some aspects.

FIG. 14 illustrates another example downlink frame portion for communicating NPBCH symbols with enhanced NPBCH repetitions, in accordance with some aspects.

FIG. 15 illustrates yet another example downlink frame portion for communicating NPBCH symbols with enhanced NPBCH repetitions, in accordance with some aspects.

DETAILED DESCRIPTION

Figure 1A:
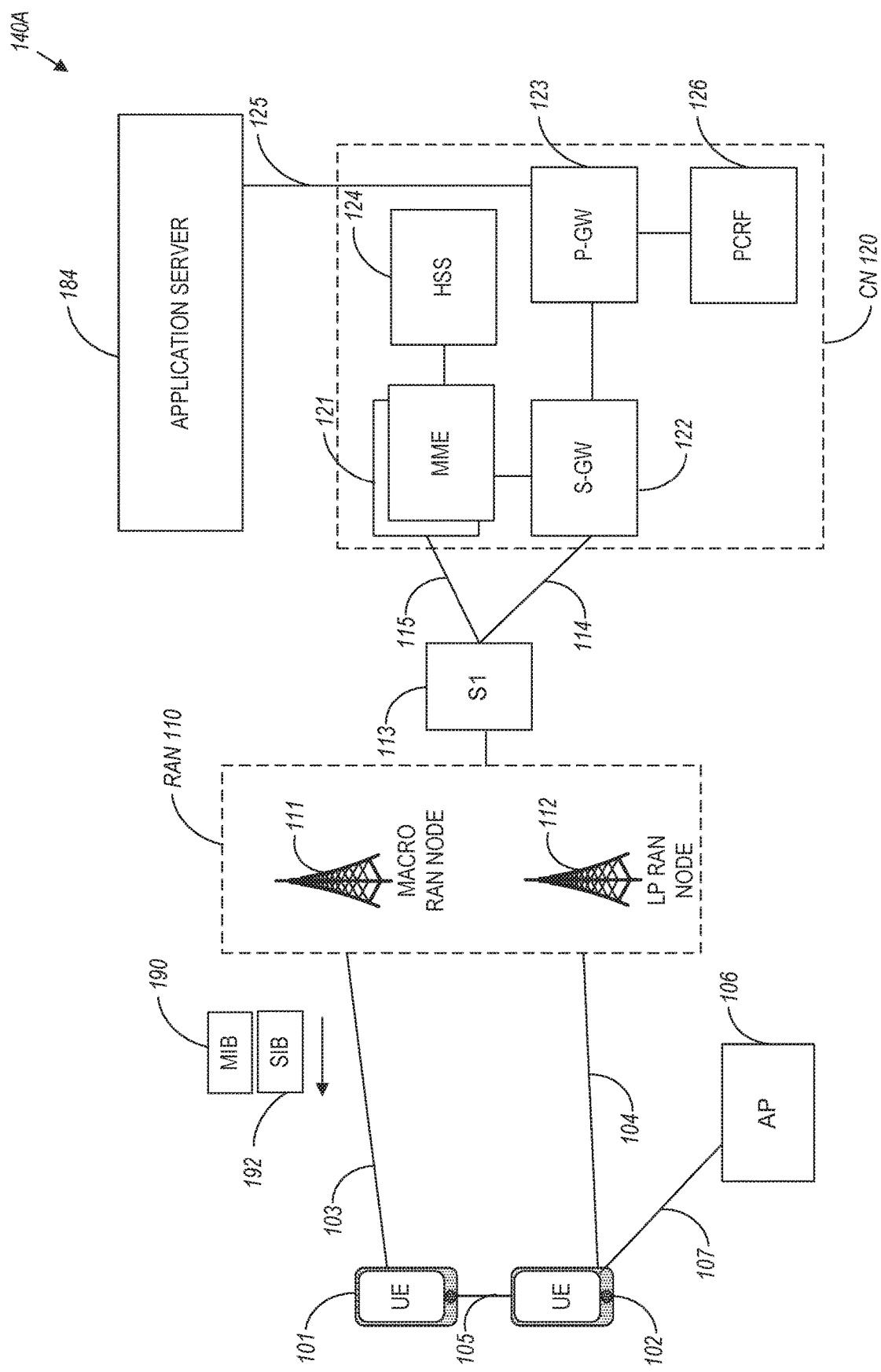
FIG. 1A illustrates an architecture of a network in accordance with some aspects.

The following description and the drawings sufficiently illustrate aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Any of the radio links described herein may operate according to any one or more of the following exemplary radio communication technologies and/or standards including, but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MulteFire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony). High capacity version of NTT (Nippon Telegraph and Telephone) (Hicap). Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, and the like), technologies operating above 300 GHz and THz bands, (3GPP/LTE based or IEEE 802.11p and other), Vehicle-to-Vehicle (V2V), Vehicle-to-X (V2X), Vehicle-to-Infrastructure (V2I), and Infrastructure-to-Vehicle (I2V) communication technologies, 3GPP cellular V2X, DSRC (Dedicated Short Range Communications) communication systems such as Intelligent-Transport-Systems and others.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3400 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 (3 Hz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) where in particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

FIG. 1A illustrates an architecture of a network in accordance with some aspects. The network 140A is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, drones, or any other computing device including a wired and/or wireless communications interface.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE, including an enhanced NB-IoT (eNB-IoT) UE and Further Enhanced (FeNB-IoT) UE. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, NB-IoT devices can be configured to operate in a single physical resource block (PRB) and may be instructed to retune two different PRBs within the system bandwidth. In some aspects, an eNB-IoT UE can be configured to acquire system information in one PRB, and then it can retune to a different PRB to receive a transmit data.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In some aspects, RAN 110 can include NG RAN or NG Core RAN. The RAN 110 can include various functions, such as, for example, an access and mobility management function (AMF), a session management function (SMF), a user plane function (UPF), a policy control function (PCF), a unified data management (UDM) function, and a network function (NF) repository function (NRF). The AMF can be used to manage access control and mobility, and can also include network slice selection functionality. The SMF can be configured to set up and manage various sessions according to a network policy. The UPF can be deployed in one or more configurations according to a desired service type. The PCF can be configured to provide a policy framework using network slicing, mobility management, and roaming (similar to PCRF in a 4G communication system). The UDM can be configured to store subscriber profiles and data (similar to an HSS in a 4G communication system). Various aspects of NG RAN and NG Core are discussed herein in reference to FIG. 1B, FIG. 1C, FIG. 1D, and FIG. 1E.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an evolved node-B (eNB), or another type of RAN node.

In accordance with some aspects, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although such aspects are not required. The OFDM signals can comprise a plurality of orthogonal subcarriers.

In some aspects, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation may be used for OFDM systems, which makes it applicable for radio resource allocation. Each column and each row of the resource grid may correspond to one OFDM symbol and one OFDM subcarrier, respectively. The duration of the resource grid in the time domain may correspond to one slot in a radio frame. The smallest time-frequency unit in a resource grid may be denoted as a resource element. Each resource grid may comprise a number of resource blocks, which describe mapping of certain physical channels to resource elements. Each resource block may comprise a collection of resource elements; in the frequency domain, this may, in some aspects, represent the smallest quantity of resources that currently can be allocated. There may be several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs according to some arrangements.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1E). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include lawful intercept, charging, and some policy enforcement.

The P-GW 123 may terminate a SGi interface toward a PDN. The P-GW 123 may route data packets between the EPC network 120 and external networks such as a network including the application server 184 (alternatively referred to as application function (AF)) via an Internet Protocol (IP) interface 125. Generally, the application server 184 may be an element offering applications that use IP bearer resources with the core network (e.g., UMTS Packet Services (PS) domain, LTE PS data services, etc). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UEs IP-CAN session: a Home PCRF (H-PCRF) within a HPLMN and a Visited PCRF (V-PCRF) within a Visited to Public Land Mobile Network (VPLMN). The PCRF 126 may be communicatively coupled to the application server 184 via the P-GW 123. The application server 184 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 184.

In an example, any of the nodes 111 or 112 can be configured to communicate to the UEs 101, 102 (e.g., dynamically) an antenna panel selection and a receive (Rx) beam selection that can be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101, 102 (e.g., dynamically) an antenna panel selection and a transmit (Tx) beam selection that can be used by the UE for data transmission on a physical uplink shared channel (PUSCH) as well as for sounding reference signal (SRS) transmission.

In some aspects, LTE-based communications can use a fixed transmission time interval (TR) length of 1 ms with 12-14 symbols, or a smaller TTI can also be used (e.g., in NR-based communications). The transmission of a request, grant, or data can be achieved by using one or more subframes with a TTI. In this regard, the TTI length can impact both the time for transmitting over the air as well as the processing time at transmitters and receivers.

In some aspects, the eNB 111 can be configured to communicate a master information block (MIB) 190 and a system information block (SIB) 192. The MIB 190 can include physical layer information of the eNB cell, such as system bandwidth, system frame number information, and other configuration information which in turn can be used to receive the SIB 192 as well as other system information used when entering a new cell during handover, for cell reselection, or radio resource control (RRC) reestablishment. The MIB 190 can be transmitted on a physical broadcast channel (PBCH) or a narrowband PBCH (NPBCH), and the SIB 192 can be transmitted on a physical downlink shared channel (PDSCH). In LTE networks that support machine-type communications (MTC), enhanced MTC (eMTC), and further enhanced MTC (FeMTC) features, the SIB 192 can include system information block 1 bandwidth reduced (SIB1-BR) or system information block 1 narrowband (SIB1-NB) information.

In some aspects, category M1 UEs (i.e., UEs operating inside an LTE system under coverage enhanced (CE) mode A or mode B and using a reduced bandwidth such as 1.4 MHz) can experience acquisition delays associated with the reception of system information such as 190 and 192. For example, a UE 101 can be configured to acquire the MIB 190 of the target cell during handover procedures, which can increase handover delay significantly for such category M1 UEs. Additionally, in some aspects, the acquisition delay of the MIB 190 and the SIB 192 (e.g., SIB1-BR) may become greater than or equal to the SIB1-BR modification boundary, and then the UE may have to reacquire the MIB 190.

In some aspects the handover latency of eMTC UEs operating in CE Mode A and CE Mode B may exceed the conversational voice latency requirement and lead to a degradation of voice-over-LTE (VoLTE) performance in both coverage extension scenarios. Furthermore, the latency performance of system acquisition in idle state may degrade idle state mobility procedures, such as cell re-selection, paging interruption, cell global identity (CUI) reading, and radio resource control (RRC) re-establishment.

In some aspects, category NB1 UEs (i.e., UEs operating inside an LTE system and using a reduced bandwidth such as 180 kHz with a single PRB) can experience acquisition delays associated with the reception of system information such as MIB 190 and SIB 192. For example, the acquisition delay of the MIB 190 (e.g., MIB-NB) and the SIB 192 (e.g., SIB1-NB) may become greater than or equal to the SIB1-NB modification boundary, and then the UE may have to reacquire the MIB-NB.

In some aspects, techniques described herein can be used to improve system information acquisition latency for eNB-IoT and MTC (including eMTC and FeMTC) UEs. More specifically, techniques described herein associated with enhanced PBCH and NPBCH repetitions can be used to improve the latency performance of connected state FeMTC procedures in coverage enhancement scenarios, such as handover. Techniques described herein can also be used to further enhance the latency performance of idle state FeMTC procedures in coverage enhancement scenarios, such as cell re-selection, paging interruption, CGI reading, and RRC re-establishment. Additionally, techniques described herein can be used to improve the latency performance of idle state eNB-IoT procedures in coverage enhancement scenarios, such as cell re-selection, paging interruption, CGI reading, and RRC re-establishment by enhancing the design of NPBCH and by introducing assumptions on the persistence of the scheduling information for the SIB1-NB. In this regard, parameter names and any associated parameter ranges and/or values including the number of bits and/or any other details disclosed herein and used for encoding such information, shall be construed as being illustrative of various aspects and shall not be construed in a limiting sense.

Figure 1B:
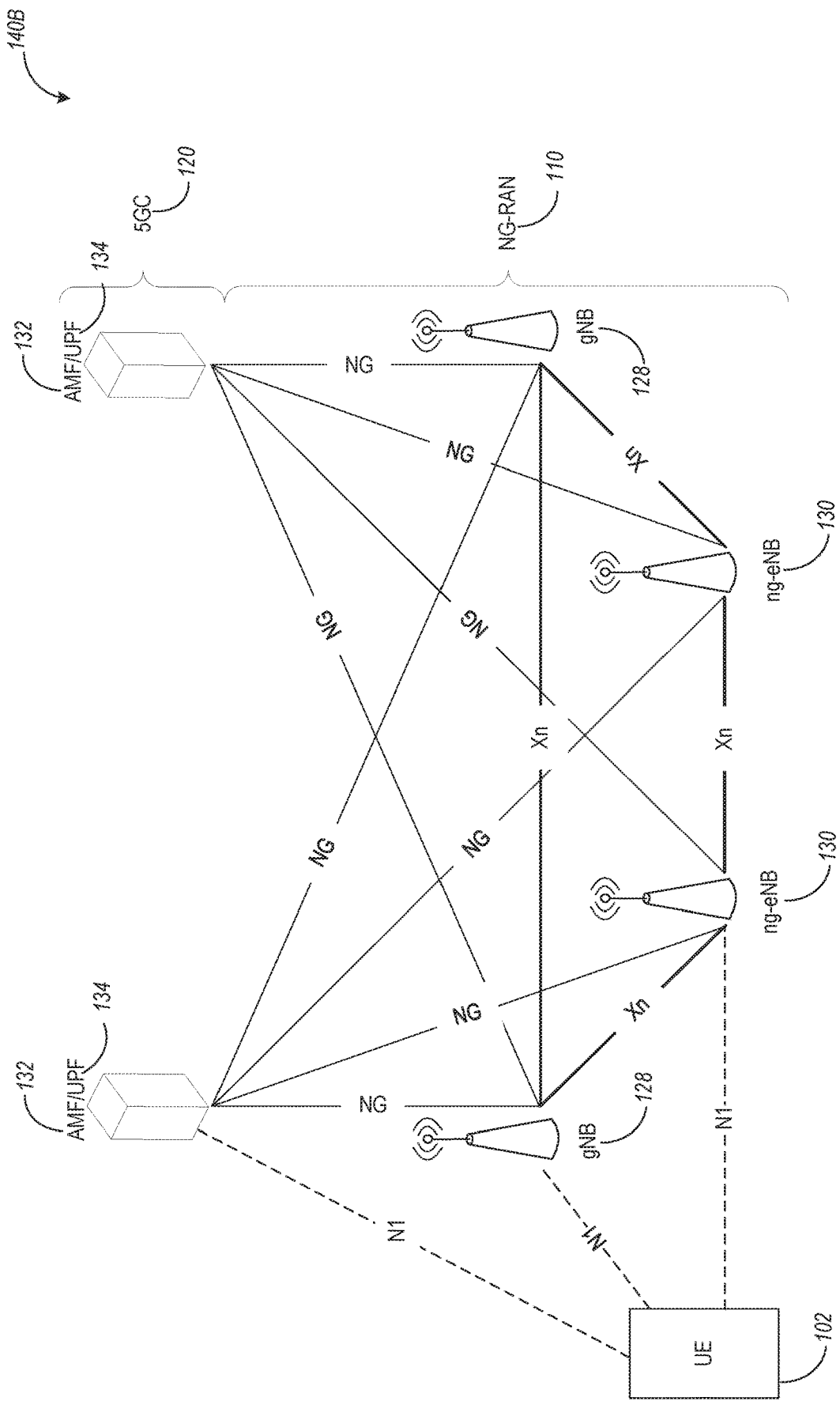
FIG. 1B is a simplified diagram of an overall next generation (NG) system architecture in accordance with some aspects.

FIG. 1B is a simplified diagram of a next generation (NG) system architecture 140B in accordance with some aspects. Referring to FIG. 1B, the NG system architecture 140B includes RAN 110 and a 5G network core (5GC) 120. The NG-RAN 110 can include a plurality of nodes, such as gNBs 128 and NG-eNBs 130. The gNBs 128 and the NG-eNBs 130 can be communicatively coupled to the UE 102 via. e.g., an N1 interface.

The core network 120 (e.g., a 5G core network or 5GC) can include an access and mobility management function (AMF) 132 and/or a user plane function (UPF) 134. The AMF 132 and the UPF 134 can be communicatively coupled to the gNBs 128 and the NG-eNBs 130 via NG interfaces. More specifically, in some aspects, the gNBs 128 and the NG-eNBs 130 can be connected to the AMF 132 by NG-C interfaces, and to the UPF 134 by NG-U interfaces. The gNBs 128 and the NG-eNBs 130 can be coupled to each other via Xn interfaces.

In some aspects, a gNB 128 can include a node providing new radio (NR) user plane and control plane protocol termination towards the UE, and is connected via the NG interface to the 5GC 120. In some aspects, an NG-eNB 130 can include a node providing evolved universal terrestrial radio access (E-UTRA) user plane and control plane protocol terminations towards the UE, and is connected via the NG interface to the 5GC 120.

In some aspects, each of the gNBs 128 and the NG-eNBs 130 can be implemented as a base station, a mobile edge server, a small cell, a home eNB, and so forth.

Figure 1C:
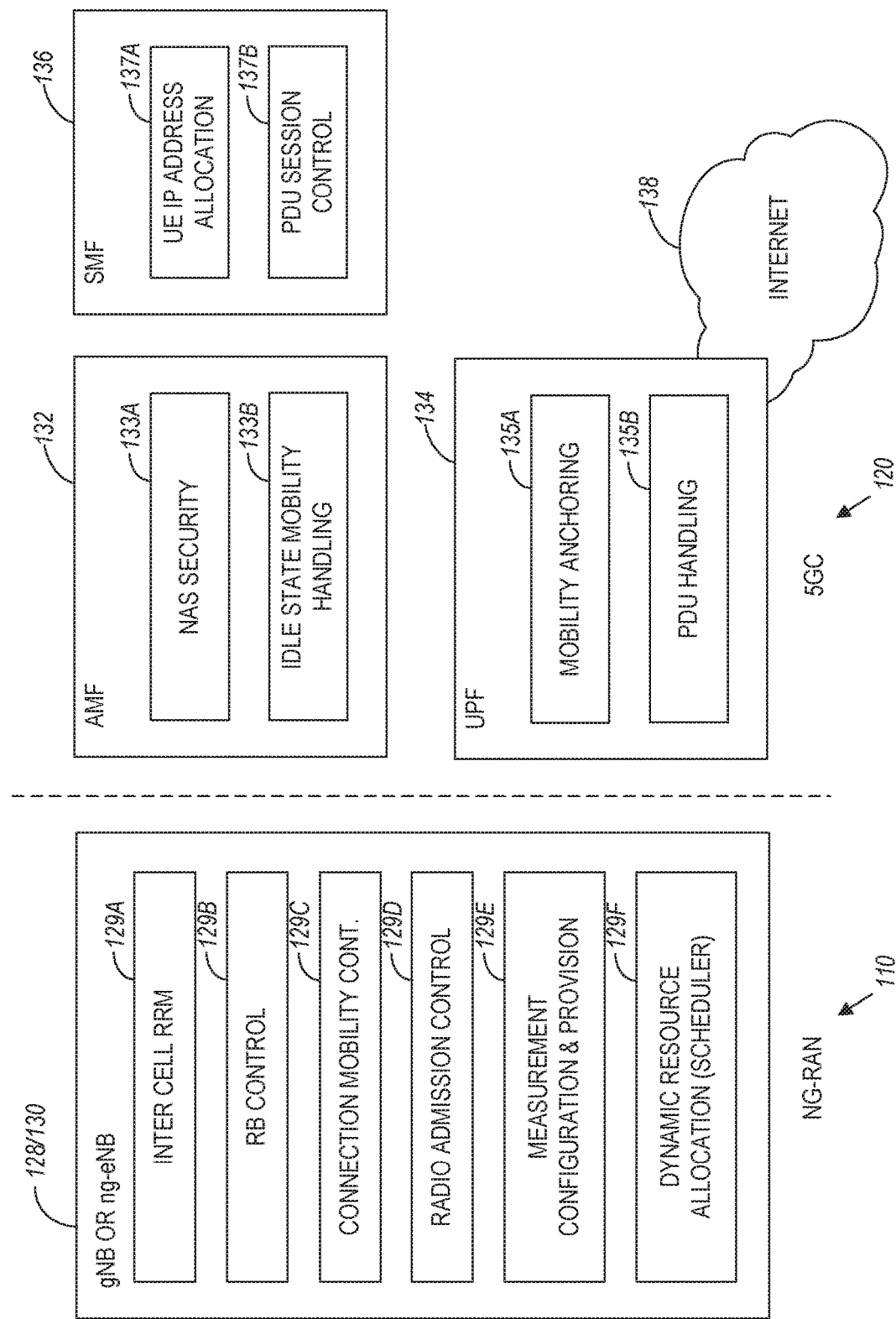
FIG. 1C illustrates a functional split between next generation radio access network (NG-RAN) and a the 5G Core network (5GC) in accordance with some aspects.

FIG. 1C illustrates a functional split between NG-RAN and the 5G Core (5GC) in accordance with some aspects. Referring to FIG. 1C, there is illustrated a more detailed diagram of the functionalities that can be performed by the gNBs 128 and the NG-eNBs 130 within the NG-RAN 110, as well as the AMF 132, the UPF 134, and the SMF 136 within the 5GC 120. In some aspects, the 5GC 120 can provide access to the Internet 138 to one or more devices via the NG-RAN 110.

In some aspects, the gNBs 128 and the NG-eNBs 130 can be configured to host the following functions: functions for Radio Resource Management (e.g., inter-cell radio resource management 129A, radio bearer control 129B, connection mobility control 129C, radio admission control 129D, connection mobility control 129C, dynamic allocation of resources to UEs in both uplink and downlink (scheduling) 129F); IP header compression, encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); measurement and measurement reporting configuration for mobility and scheduling 129E; transport level packet marking in the uplink; session management; support of network slicing; QoS flow management and mapping to data radio bearers; support of UEs in RRC_I-NACTIVE state; distribution function for non-access stratus (NAS) messages; radio access network sharing; dual connectivity; and tight interworking between NR and E-UTRA, to name a few.

In some aspects, the AMF 132 can be configured to host the following functions, for example: NAS signaling termination; NAS signaling security 133A; access stratus (AS) security control; inter core network (CN) node signaling for mobility between 3GPP access networks; idle state mode mobility handling 133B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; and/or SMF selection, among other functions.

The UPF 134 can be configured to host the following functions, for example: mobility anchoring 135A (e.g., anchor point for Intra-/Inter-RAT mobility); packet data unit (PDU) handling 135B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session, QoS handling for user plane, e.g., packet filtering, gating, UL/DL rate enforcement, uplink traffic verification (SDF to QoS flow mapping); and/or downlink packet buffering and downlink data notification triggering, among other functions.

The Session Management function (SMF) 136 can be configured to host the following functions, for example, session management; UE IP address allocation and management 137A; selection and control of UP function; PDU session control 137B, including configuring traffic steering at UPF 134 to route traffic to proper destination; control part of policy enforcement and QoS; and/or downlink data notification, among other functions.

Figure 1D:
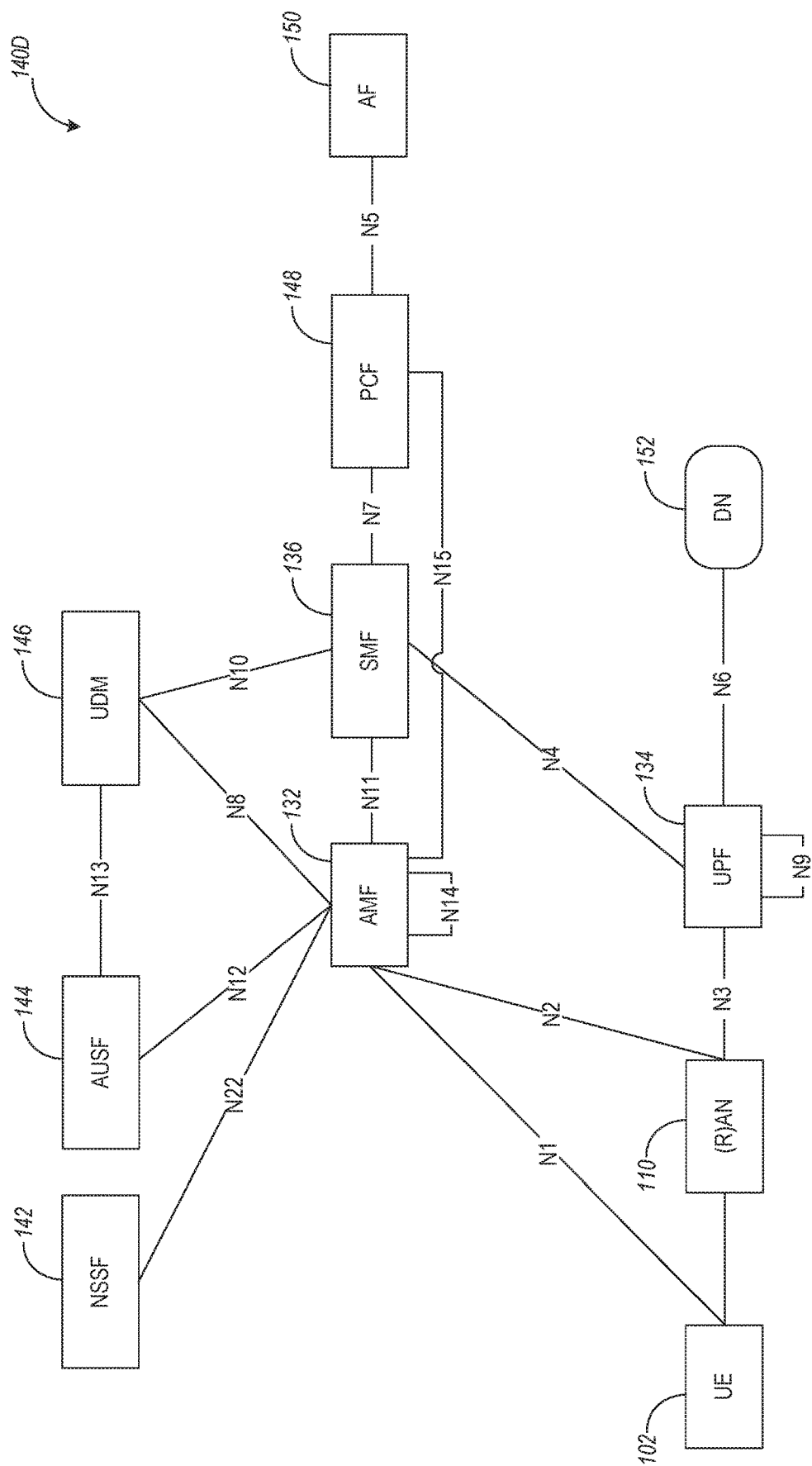
FIG. 1D and FIG. 1E illustrate a non-roaming 5G system architecture in accordance with some aspects.
Figure 1E:
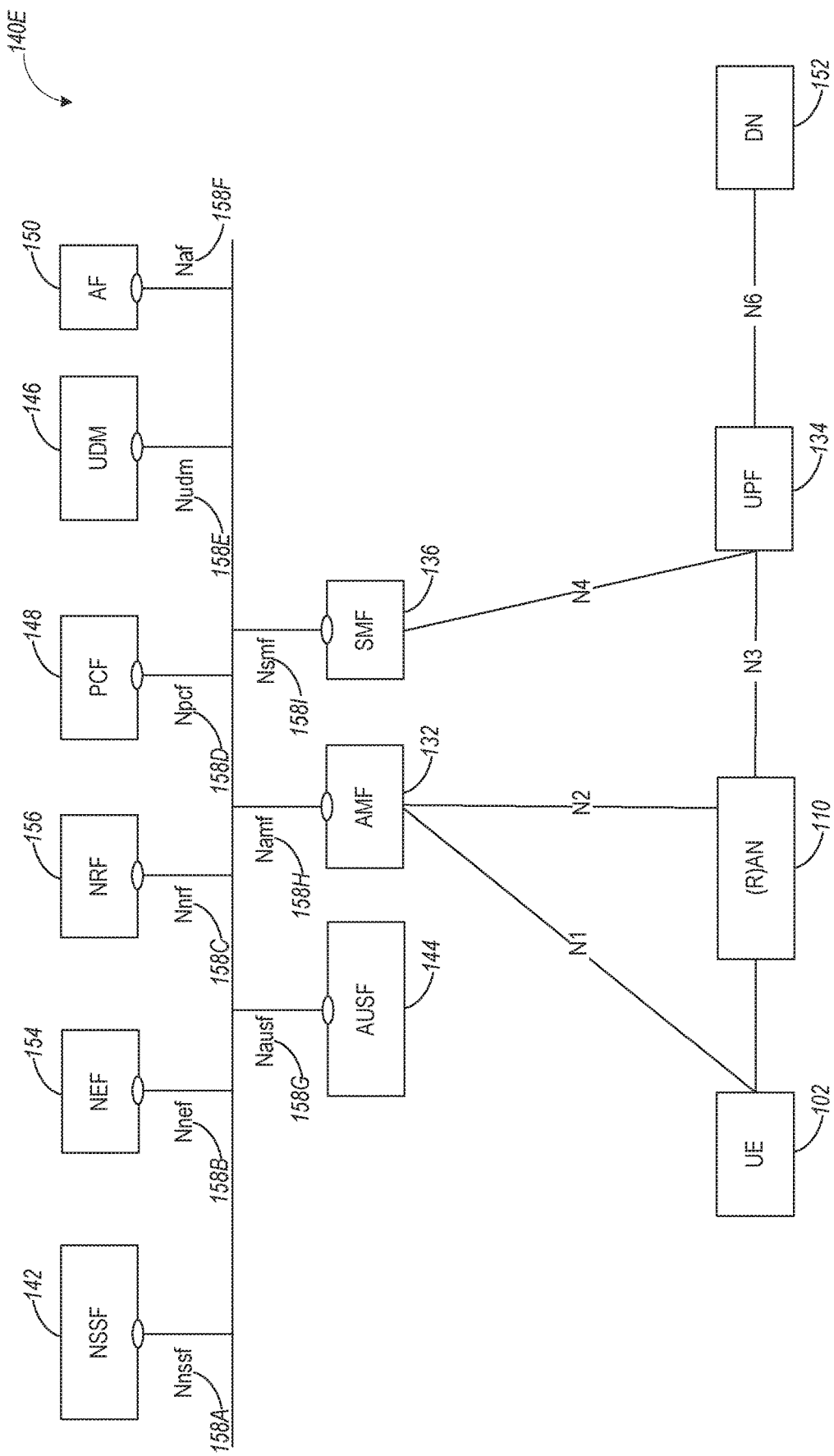

FIG. 1D and FIG. 1E illustrate a non-roaming 5G system architecture in accordance with some aspects Referring to FIG. 1D, there is illustrated a 5G system architecture 140D in a reference point representation. More specifically, UE 102 can be in communication with RAN 110 as well as one or more other 5GC network entities. The 5GC system architecture 140D includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM) 146. The UPF 134 can provide a connection to a data network (DN) 152, which can include, for example, operator services, Internet access, or third-party services.

Referring to FIG. 1E, there is illustrated a 5G system architecture HOE and a service-based representation System architecture 140E can be substantially similar to (or the same as) system architecture 140D. In addition to the network entities illustrated in FIG. 1D, system architecture 140E can also include a network exposure function (NEF) 154 and a network repository function (NRF) 156.

In some aspects, 5G system architectures can be service-based and interaction between network functions can be represented by corresponding point-to-point reference points Ni (as illustrated in FIG. 1D) or as service-based interfaces (as illustrated in FIG. 1E).

A reference point representation shows that an interaction can exist between corresponding NF services. For example, FIG. 1D illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150), N6 (between the UPF 134 and the DN 152), N7 (between the SMF 136 and the PCF 148), N8 (between die UDM 146 and the AMF 132), N9 (between two UPFs 134), N10 (between the UDM 146 and the SMF 136), N11 (between the AMF 132 and the SMF 136), N12 (between the AUSF 144 and the AMF 132), N13 (between the AUSF 144 and the UDM 146), N14 (between two AMFs 132), N15 (between the PCF 148 and the AMF 132 in case of a non-roaming scenario, or between the PCF 148 and a visited network and AMF 132 in case of a roaming scenario), N16 (between two SMFs; not illustrated in FIG. 1D), and N22 (between AMF 132 and NSSF 142). Other reference point representations not shown in FIG. 1D can also be used.

In some aspects, as illustrated in FIG. 1E, service-based representations can be used to represent network functions within the control plane that enable other authorized network functions to access their services. In this regard, 5G system architecture 140E can include the following service-based interfaces Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150). Nnrf 158C (a service-based interface exhibited by the NRF 156). Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1E can also be used.

Figure 1F:
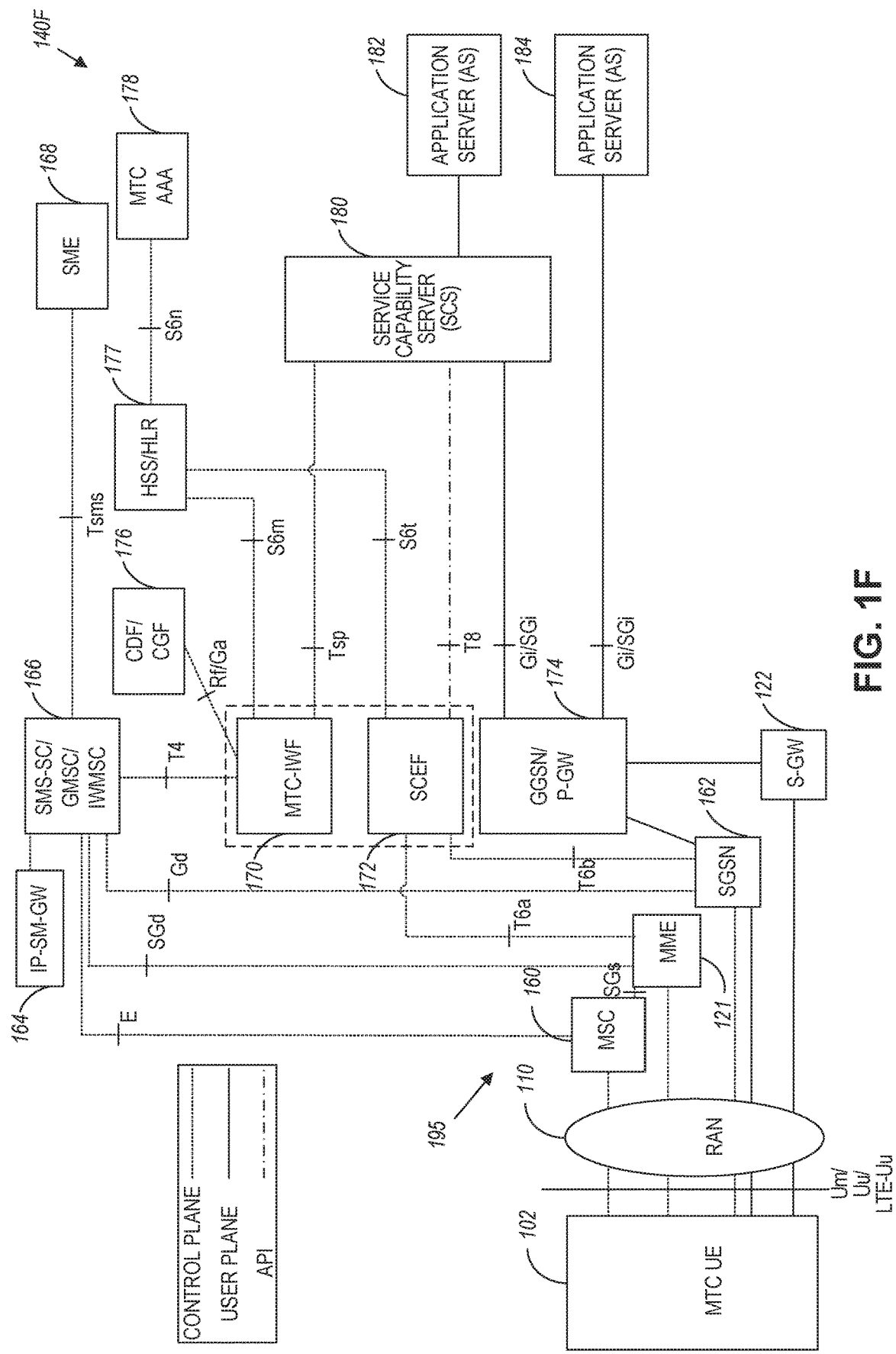
FIG. 1F illustrates an example Cellular Internet-of-Things (CIoT) network architecture in accordance with some aspects.

FIG. 1F illustrates an example CIoT network architecture in accordance with some aspects. Referring to FIG. 1F, the CIoT architecture 140F can include the UE 102 and the RAN 110 coupled to a plurality of core network entities. In some aspects, the UE 102 can be machine-type communication (MTC) UE. The CIoT network architecture 140F can further include a mobile services switching center (MSC) 160, MME 121, a serving GPRS support note (SGSN) 162, a S-GW 122, an IP-Short-Message-Gateway (IP-SM-GW) 164, a Short Message Service Service Center (SMS-SC)/gateway mobile service center (GMSC)/Interworking to MSC (IWMSC) 166. MTC interworking function (MTC-IWF) 170, a Service Capability Exposure Function (SCEF) 172, a gateway GPRS support node (GGSN)/Patent-GW 174, a charging data function (CDF)/charging gateway function (CGF) 176, a home subscriber server (HHS)/a home location register (HLR) 177, short message entities (SME) 168, MTC authorization, authentication, and accounting (MTC AAA) server 178, a service capability server (SCS) 180, and application servers (AS) 182 and 184.

In some aspects, the SCEF 172 can be configured to securely expose services and capabilities provided by various 3GPP network interfaces. The SCEF 172 can also provide means for the discovery of the exposed services and capabilities, as well as access to network capabilities through various network application programming interfaces (e.g., API interfaces to the SCS 180).

FIG. 1F further illustrates various reference points between different servers, functions, or communication nodes of the CIoT network architecture 140F. Some example reference points related to MTC-IWF 170 and SCEF 172 include the following: Tsms (a reference point used by an entity outside the 3GPP network to communicate with UEs used for MTC via SMS), Tsp (a reference point used by a SCS to communicate with the MTC-IWF related control plane signaling), T4 (a reference point used between MTC-IWF 170 and the SMS-SC 166 in the HPLMN), T6a (a reference point used between SCEF 172 and serving MME 121), T6b (a reference point used between SCEF 172 and serving SGSN 162), T8 (a reference point used between the SCEF 172 and the SCS/AS 180/182), S6m (a reference point used by MTC-IWF 170 to interrogate HSS/HLR 177), S6n (a reference point used by MTC-AAA server 178 to interrogate HSS/HLR 177), and S6t (a reference point used between SCEF 172 and HSS/HLR 177).

In some aspects, the CIoT UE 102 can be configured to communicate with one or more entities within the CIoT architecture 140F via the RAN 110 according to a Non-Access Stratum (NAS) protocol, and using one or more reference points, such as a narrowband air interface, for example, based on one or more communication technologies, such as Orthogonal Frequency-Division Multiplexing (OFDM) technology. As used herein, the term "CIoT UE" refers to a UE capable of CIoT optimizations, as part of a CIoT communications architecture.

In some aspects, the NAS protocol can support a set of NAS messages for communication between the CIoT UE 102 and an Evolved Packet System (EPS) Mobile Management Entity (MME) 121 and SGSN 162.

In some aspects, the CIoT network architecture 140F can include a packet data network, an operator network, or a cloud service network, having, for example, among other things, a Service Capability Server (SCS) 180, an Application Server (AS) 182, or one or more other external servers or network components.

The RAN 110 can be coupled to the HSS/HLR servers 177 and the AAA servers 178 using one or more reference points including, for example, an air interface based on an S6a reference point, and configured to authenticate/authorize CIoT UE 102 to access the CIoT network. The RAN 110 can be coupled to the CIoT network architecture 140F using one or more other reference points including, for example, an air interface corresponding to an SGi/Gi interface for 3GPP accesses. The RAN 110 can be coupled to the SCEF 172 using, for example, an air interface based on a T6a/T6b reference point, for service capability exposure. In some aspects, the SCEF 172 may act as an API GW towards a third-party application server such as AS 182. The SCEF 172 can be coupled to the HSS/HLR 177 and MTC AAA 178 servers using an S6t reference point, and can further expose an Application Programming Interface to network capabilities.

In certain examples, one or more of the CIoT devices disclosed herein, such as the CIoT UE 102, the CIoT RAN 110, etc., can include one or more other non-CIoT devices, or non-CIoT devices acting as CIoT devices, or having functions of a CIoT device. For example, the CIoT UE 102 can include a smart phone, a tablet computer, or one or more other electronic device acting as a CIoT device for a specific function, while having other additional functionality.

In some aspects, the RAN 110 can include a CIoT enhanced Node B (CIoT eNB) 111 communicatively coupled to the CIoT Access Network Gateway (CIoT GW) 195. In certain examples, the RAN 110 can include multiple base stations (e.g., CIoT eNBs) connected to the CIoT GW 195, which can include MSC 160, MME 121, SGSN 162, and/or S-GW 122. In certain examples, the internal architecture of RAN 110 and CIoT GW 195 may be left to the implementation and need not be standardized.

As used herein, the term "circuitry" may refer to, be part of, or include an Application Specific Integrated Circuit (ASIC) or other special purpose circuit, an electronic circuit, a processor (shared, dedicated, or group), or memory (shared, dedicated, or group) executing one or more software or firmware programs, a combinational logic circuit, or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware. In some aspects, circuitry as well as modules disclosed herein may be implemented in combinations of hardware, software and/or firmware. In some aspects, functionality associated with a circuitry can be distributed across more than one piece of hardware or software/firm ware module. In some aspects, modules (as disclosed herein) may include logic, at least partially operable in hardware. Aspects described herein may be implemented into a system using any suitably configured hardware or software.

Figure 2:
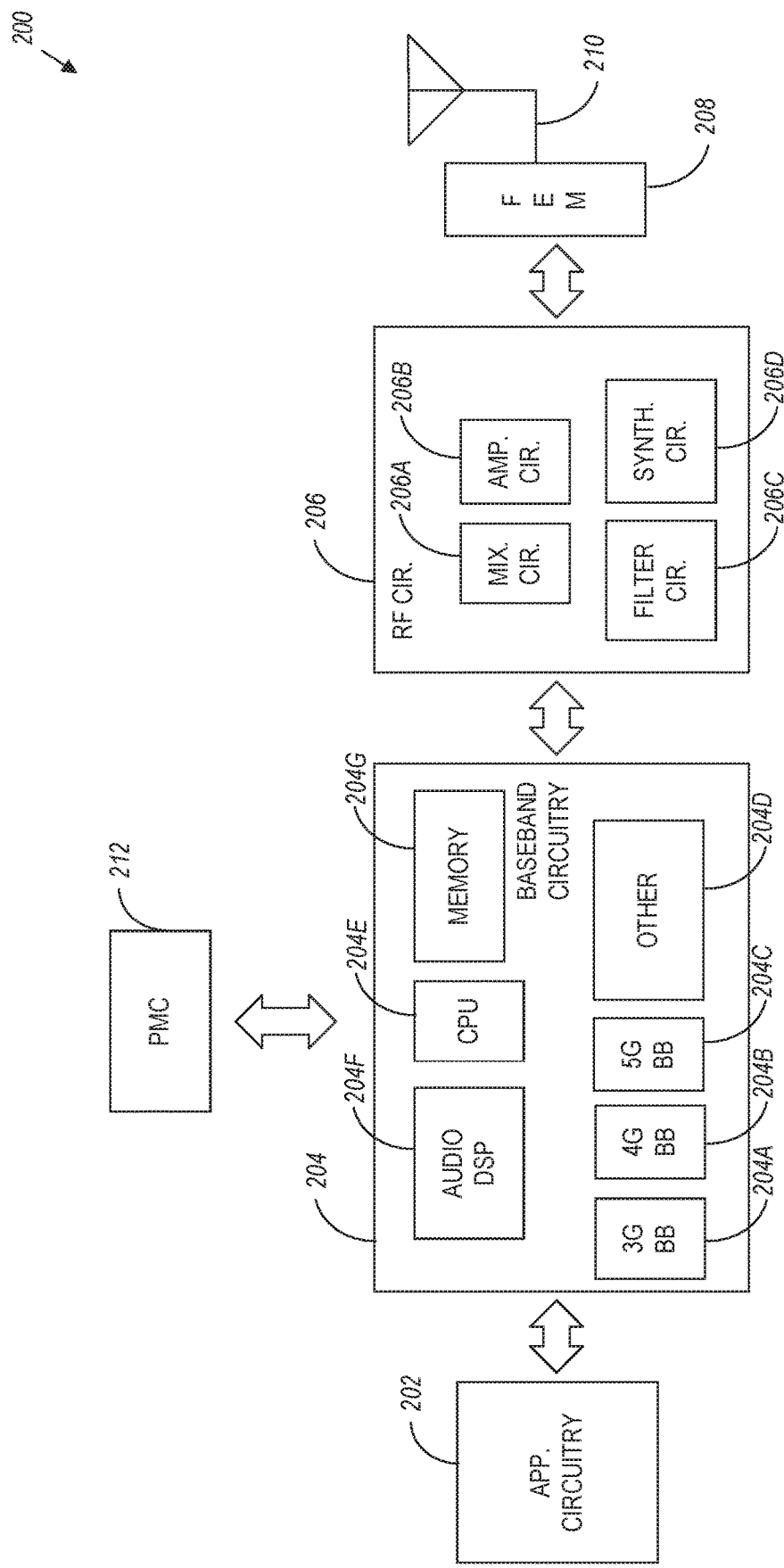
FIG. 2 illustrates example components of a device 200 in accordance with some aspects.

FIG. 2 illustrates example components of a device 200 in accordance with some aspects. In some aspects, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a LTE or a RAN node. In some aspects, the device 200 may include fewer elements (e.g., a RAN node may not utilize application circuitry 202, and instead include a processor/controller to process IP data received from an EPC). In some aspects, the device 200 may include additional elements such as, for example, memory/storage, display, camera, sensor, and/or input/output (I/O) interface elements. In other aspects, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors, special-purpose processors, and dedicated processors (e.g., graphics processors, application processors, etc.). The processors may be coupled with, and/or may include, memory/storage and may be configured to execute instructions stored in the memory/storage to enable various applications or operating systems to run on the device 200. In some aspects, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuity 204 may interface with the application circuitry 202 for generation and processing of the baseband signals and for controlling operations of the RF circuitry 206. For example, in some aspects, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other aspects, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some aspects, modulation/demodulation circuitry of the baseband circuitry 204 may include Fast-Fourier Transform (FFT), preceding, or constellation mapping/demapping functionality. In some aspects, encoding/decoding circuitry of the baseband circuitry 204 may include convolution, tail-biting convolution, turbo, Viterbi, or Low-Density Parity Check (LDPC) encoder/decoder functionality. Aspects of modulation/demodulation and encoder/decoder functionality are not limited to these examples and may include other suitable functionality in other aspects.

In some aspects, the baseband circuitry 204 may include one or more audio digital signal processor(s) (DSP) 204F. The audio DSP(s) 204F may be include elements for compression/decompression and echo cancellation and may include other suitable processing elements in other aspects. Components of the baseband circuitry 204 may be suitably combined in a single chip, a single chipset, or disposed on a same circuit board in some aspects. In some aspects, some or all of the constituent components of the baseband circuitry 204 and the application circuitry 202 may be implemented together such as, for example, on a system on a chip (SOC).

In some aspects, the baseband circuitry 204 may provide for communication compatible with one or more radio technologies. For example, in some aspects, the baseband circuitry 204 may support communication with an evolved universal terrestrial radio access network (EUTRAN) or other wireless metropolitan area networks (WMAN), a wireless local area network (WLAN), and/or a wireless personal area network (WPAN). Baseband circuitry 204 configured to support radio communications of more than one wireless protocol may be referred to as multi-mode baseband circuitry, in some aspects.

RF circuitry 206 may enable communication with wireless networks using modulated electromagnetic radiation through a non-solid medium. In various aspects, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some aspects, the receive signal path of the RF circuitry 206 may include a mixer 206A, an amplifier 206B, and a filter 206C. In some aspects, the transmit signal path of the RF circuitry 206 may include a filter 206C and a mixer 206A. RF circuitry 206 may also include a synthesizer 206D for synthesizing a frequency for use by the mixer 206A of the receive signal path and the transmit signal path. In some aspects, the mixer 206A of the receive signal path may be configured to down-convert RF signals received from the FEM circuitry 208 based on the synthesized frequency provided by synthesizer 206D, The amplifier 206B may be configured to amplify the down-converted signals and the filter 206C may be a low-pass filter (LPF) or band-pass filter (BPF) configured to remove unwanted signals from the down-converted signals to generate output baseband signals. Output baseband signals may be provided to the baseband circuitry 204 for further processing. In some aspects, the output baseband signals may optionally be zero-frequency baseband signals. In some aspects, mixer 206A of the receive signal path may comprise passive mixers.

In some aspects, the mixer 206A of the transmit signal path may be configured to up-convert input baseband signals based on the synthesized frequency provided by the synthesizer 206D to generate RF output signals for the FEM circuitry 208. The baseband signals may be provided by the baseband circuitry 204 and may be filtered by filter 206C.

In some aspects, the mixer 206A of the receive signal path and the mixer 206A of the transmit signal path may include two or more mixers and may be arranged for quadrature downconversion and upconversion, respectively. In some aspects, the mixer 206A of the receive signal path and the mixer 206A of the transmit signal path may include two or more mixers and may be arranged for image rejection (e.g., Hartley image rejection). In some aspects, the mixer 206A of the receive signal path and the mixer 206A may be arranged for direct downconversion and direct upconversion, respectively. In some aspects, the mixer 206A of the receive signal path and the mixer 206A of the transmit signal path may be configured for super-heterodyne operation.

In some aspects, the output baseband signals and the input baseband signals may optionally be analog baseband signals. According to some alternate aspects, the output baseband signals and the input baseband signals may be digital baseband signals. In these alternate aspects, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode aspects, a separate radio IC circuitry may optionally be provided for processing signals for each spectrum.

In some aspects, the synthesizer 206D may optionally be a fractional-N synthesizer or a fractional N/N+1 synthesizer, although other types of frequency synthesizers may be suitable. For example, the synthesizer 206D may be a delta-sigma synthesizer, a frequency multiplier, or a synthesizer comprising a phase-locked loop with a frequency divider.

The synthesizer 206D may be configured to synthesize an output frequency for use by the mixer 206A of the RF circuitry 206 based on a frequency input and a divider control input. In some aspects, the synthesizer 206D may be a fractional N/N+1 synthesizer.

In some aspects, frequency input may be provided by a voltage controlled oscillator (VCO), although that is not a requirement. Divider control input may be provided, for example, by either the baseband circuitry 204 or the applications circuitry 202 depending on the desired output frequency. In some aspects, a divider control input (e.g., N) may be determined from a look-up table based on a channel indicated by the applications circuitry 202.

Synthesizer circuitry 206D of the RF circuitry 206 may include a divider, a delay-locked loop (DLL), a multiplexer and a phase accumulator. In some aspects, the divider may be a dual modulus divider (DMD) and the phase accumulator may be a digital phase accumulator (DPA). In some aspects, the DMD may be configured to divide the input signal by either N or N+1 (e.g., based on a carry out) to provide a fractional division ratio. In some example aspects, the DLL may include a set of cascaded, tunable, delay elements, a phase detector, a charge pump and a D-type flip-flop. In these aspects, the delay elements may be configured to break a VCO period up into Nd equal packets of phase, where Nd is the number of delay elements in the delay line. In this way, the DLL provides negative feedback to assist in keeping the total delay through the delay line to one VCO cycle.

In some aspects, synthesizer circuitry 206D may be configured to generate a carrier frequency as the output frequency, while in other aspects, the output frequency may be a multiple of the carrier frequency (e.g., twice the carrier frequency, or four times the carrier frequency) and may be used in conjunction with quadrature generator and divider circuitry to generate multiple signals at the carrier frequency with multiple different phases with respect to each other. In some aspects, the output frequency may be a LO frequency (fLO). In some aspects, the RF circuitry 206 may include an IQ/polar converter.

FEM circuitry 208 may include a receive signal path which may include circuitry configured to operate on RF signals received from one or more antennas 210, and/or to amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various aspects, the amplification through the transmit signal paths or the receive signal paths may be done in part or solely in the RF circuitry 206, in part or solely in the FEM circuitry 208, or in both the RF circuitry 206 and the FEM circuitry 208.

In some aspects, the FEM circuitry 208 may include a TX/RX switch to switch between transmit mode and receive mode operation. The FEM circuitry 208 may include a receive signal path and a transmit signal path. The receive signal path of the FEM circuitry 208 may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212, may manage power provided to the baseband circuitry 204. The PMC 212 may control power-source selection, voltage scaling, battery charging, and/or DC-to-DC conversion. The PMC 212 may, in some aspects, be included when the device 200 is capable of being powered by a battery, for example, when the device is included in a UE. The PMC 212 may increase the power conversion efficiency while providing beneficial implementation size and heat dissipation characteristics.

FIG. 2 shows the PMC 212 coupled with the baseband circuitry 204. In other aspects, the PMC 212 may be additionally or alternatively coupled with, and perform similar power management operations for, other components such as, but not limited to, application circuitry 202, RF circuitry 206, or FEM circuitry 208.

In some aspects, the PMC 212 may control, or otherwise be part of, various power saving mechanisms of the device 200. For example, if the device 200 is in an RRC_Connected state, in which it is still connected to the RAN node as it expects to receive traffic shortly, then it may enter a state known as Discontinuous Reception Mode (DRX) after a period of inactivity. During this state, the device 200 may power down for brief intervals of time and thus save power.

According to some aspects, if there is no data traffic activity for an extended period of time, then the device 200 may transition off to an RRC_Idle state, in which it disconnects from the network and does not perform operations such as channel quality feedback, handover, etc. The device 200 goes into a very low power state and it performs paging during which it periodically wakes up to listen to the network and then powers down again. The device 200 may transition back to RRC_Connected state to receive data.

An additional power saving mode may allow a device to be unavailable to the network for periods longer than a paging interval (ranging from seconds to a few hours). During this time, the device 200 in some aspects may be unreachable to the network and may power down. Any data sent during this time incurs a delay, which may be large, and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
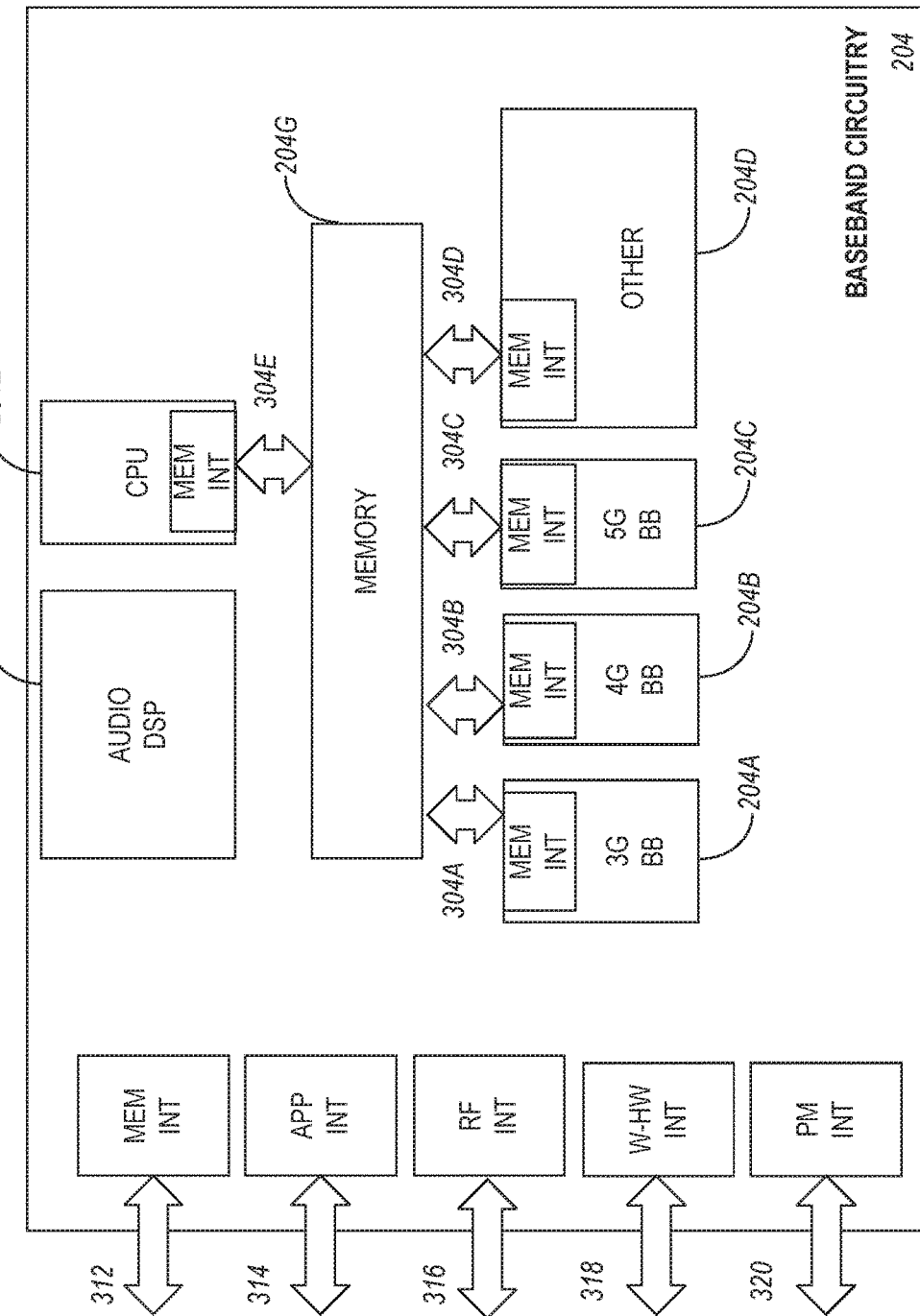
FIG. 3 illustrates example interfaces of baseband circuitry in accordance with some aspects.

FIG. 3 illustrates example interfaces of baseband circuitry 204, in accordance with some aspects. As discussed above, the baseband circuitry 204 of FIG. 2 may comprise processors 204A-204E and a memory 204G utilized by said processors. Each of the processors 204A-204E may include a memory interface, 304A-304E, respectively, to send/receive: data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
FIG. 4 is an illustration of a control plane protocol stack in accordance with some aspects.

FIG. 4 is an illustration of a control plane protocol stack in accordance with some aspects. In one aspect, a control plane 400 is shown as a communications protocol stack between the LTE 101 (or alternatively, the UE 102), the RAN node 111 (or alternatively, the RAN node 112), and the MME 121.

The PHY layer 401 may in some aspects transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may in some aspects still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 402 may in some aspects perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 403 may in some aspects operate in a plurality of modes of operation, including: Transparent Mode (TM), Unacknowledged Mode (UM), and Acknowledged Mode (AM). The RLC layer 403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 403 may also in some aspects execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 404 may in some aspects execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

In some aspects, primary services and functions of the RRC layer 405 may include broadcast of system information (e.g., included in Master Information Blocks (MIBs) or System Information Blocks (SIBs) related to the non-access stratum (NAS)); broadcast of system information related to the access stratum (AS); paging, establishment, maintenance, and release of an RRC connection between the UE and E-UTRAN (e.g., RRC connection paging, RRC connection establishment RRC connection modification, and RRC connection release); establishment, configuration, maintenance, and release of point-to-point Radio Bearers; security functions including key management, inter-radio access technology (RAT) mobility; and measurement configuration for UE measurement reporting. Said MIB; and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 401, the MAC layer 402, the RLC layer 403, the PDCP layer 404, and the RRC layer 405.

The non-access stratum (NAS) protocols 406 form the highest stratum of the control plane between the UE 101 and the MME 121 as illustrated in FIG. 4. In aspects, the NAS protocols 406 support the mobility of the UE 101 and the session management procedures to establish and maintain IP connectivity between the UE 101 and the P-GW 123.

The S1 Application Protocol (S1-AP) layer 415 may support the functions of the S1 interface and comprise Elementary Procedures (EPs). An EP is a unit of interaction between the RAN node 111 and the CN 120. In certain aspects, the S1-AP layer 415 services may comprise two groups. UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (which may alternatively be referred to as the SCTP/IP layer) 414 may ensure reliable delivery of signaling messages between the RAN node 111 and the MME 121 based, in part, on the IP protocol, supported by the IP layer 413. The L2 layer 412 and the L1 layer 411 may refer to communication links (e.g., wired or wireless) used by the RAN node 111 and the MME 121 to exchange information.

The RAN node 111 and the MME 121 may utilize an S1-MME interface to exchange control plane data via a protocol stack comprising the L1 layer 411, the L2 layer 412, the IP layer 413, the SCTP layer 414, and the S1-AP layer 415.

Figure 5:
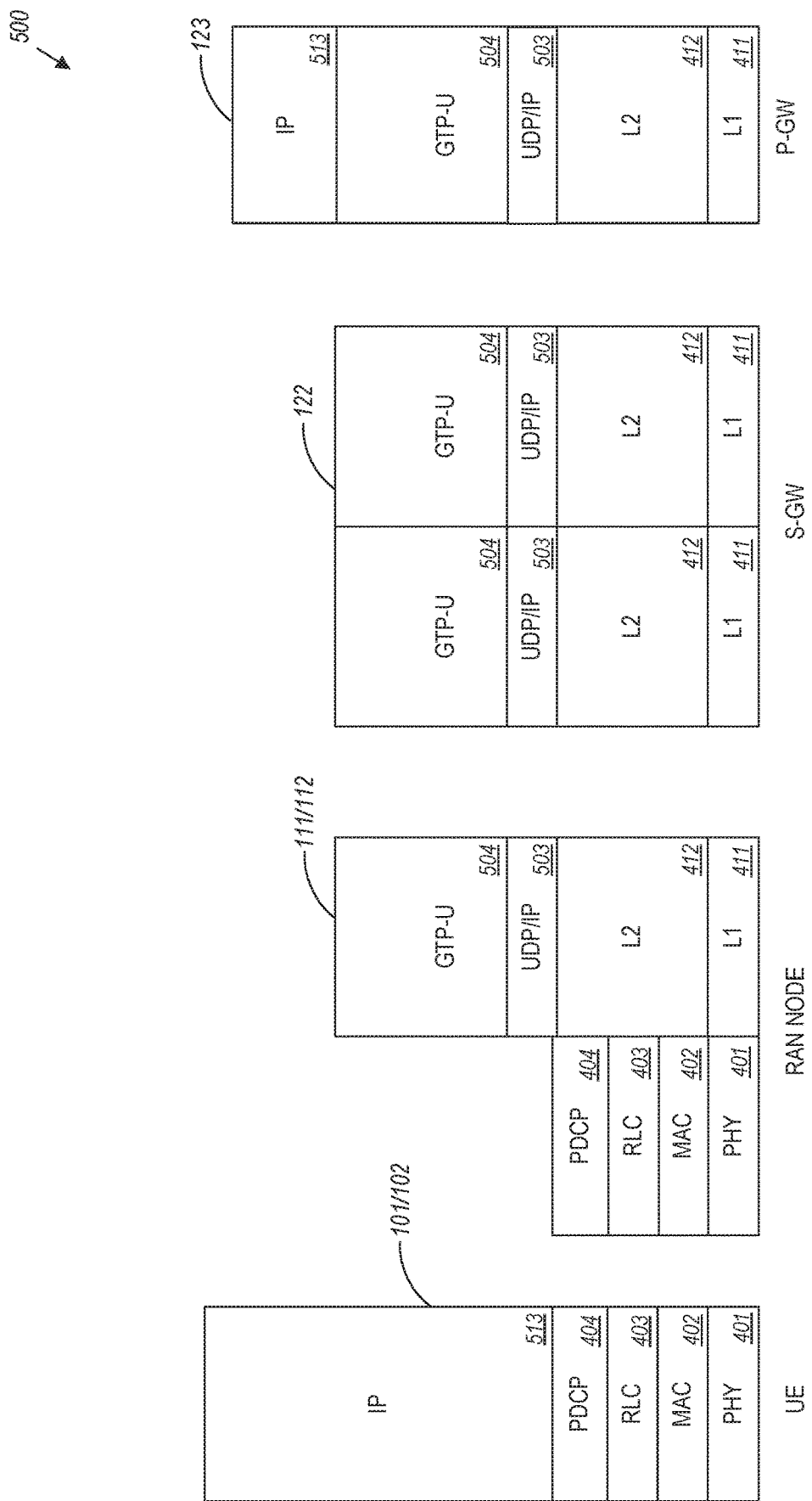
FIG. 5 is an illustration of a user plane protocol stack in accordance with some aspects.

FIG. 5 is an illustration of a user plane protocol stack in accordance with some aspects. In this aspect, a user plane 500 is shown as a communications protocol stack between the UE 101 (or alternatively, the LTE 102), the RAN node 111 (or alternatively, the RAN node 112), the S-GW 122, and the P-GW 123. The user plane 500 may utilize at least some of the same protocol layers as the control plane 400. For example, the UE 101 and the RAN node 111 may utilize a Uu interface (e.g., an LTE-Uu interface) to exchange user plane data via a protocol stack comprising the PHY layer 401, the MAC layer 402, the RLC layer 403, and the PDCP layer 404.

The General Packet Radio Service (GPRS) Tunneling Protocol for the user plane (GTP-U) layer 504 may be used for carrying user data within the GPRS core network and between the radio access network and the core network. The user data transported can be packets in IPv4, IPv6, or PPP formats, for example. The UDP and IP security (UDP/IP) layer 503 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 411, the L2 layer 412, the UDP/IP layer 503, and the GTP-U layer 504. The S-GW 122 and the P-GW 123 may utilize an S5/S8a interface to exchange user plane data via a protocol stack comprising the L1 layer 411, the L2 layer 412, the UDP/IP layer 503, and the GTP-U layer 504. As discussed above with respect to FIG. 4, NAS protocols support the mobility of the UE 101 and the session management procedures to establish and maintain IP connectivity between the UE 101 and the P-GW 123.

Figure 6:
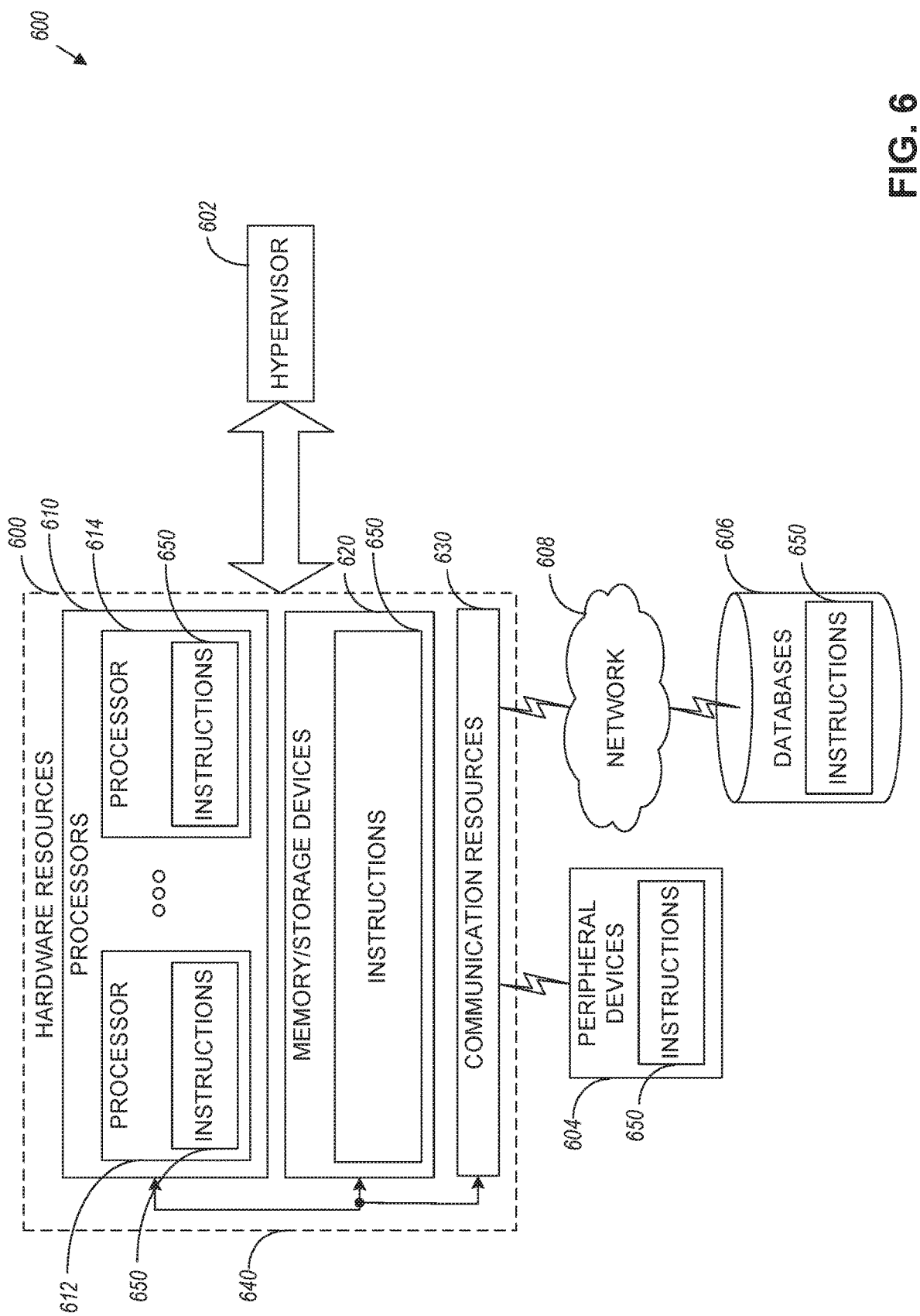
FIG. 6 is a block diagram illustrating components, according to some example aspects, able to read instructions from a machine-readable or computer-readable medium (e.g., a non-transitory machine-readable storage medium) and perform any one or more of the methodologies discussed herein.

FIG. 6 is a block diagram illustrating components, according to some example aspects, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640. For aspects in which node virtualization (e.g., NFV) is utilized, a hypervisor 602 may be executed to provide an execution environment for one or more network slices and/or sub-slices to utilize hardware resources 600

The processors 610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 612 and a processor 614.

The memory/storage devices 620 may include main memory, disk storage, or any suitable combination thereof. The memory/storage devices 620 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 630 may include interconnection or network interface components or other suitable devices communicate with one or more peripheral devices 604 or one or more databases 606 via a network 608. For example, the communication resources 630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

Figure 7:
FIG. 7 illustrates an example downlink frame portion for communicating physical broadcast channel (PBCH) symbols.

FIG. 7 illustrates an example downlink frame portion 700 for communicating physical broadcast channel (PBCH) symbols. In some aspects, signal-to-noise ratio (SNR) conditions for coverage extension (CE) scenarios of Category M1 UEs can be −6 dB for CE Mode A UEs and −12 dB for CE Mode B UEs. In some aspects, CE Mode A SNR target may be difficult to achieve when decoding PBCH using a single transmission time interval (TTI), and multiple TTIs (e.g., parameterized by window length) may be needed. In some aspects, handover interruption time can be determined using RRC procedure delay, time to acquire MIB (T_MIB) and time to perform a cell search (T_search). In some aspects, the handover interruption time can be 50 ms plus T_MIB. In order to meet the conversational voice requirement during the handover procedure, T_MIB can be configured to be 40 ms or less. In this regard, PBCH reception at CE Mode A SNR target can be accomplished within a single PBCH TTI, which results in a handover interruption time of approximately 90 ms. Assuming variability in the propagation conditions as well as the delays due to higher layers, this interruption time may be sufficient for conversational voice. In some aspects and according to PBCH demodulation parameters, SNR to achieve 1% error rate in PBCH decoding using a single PBCH TTI can be approximately −2.2 dB. Therefore, the performance gap in PBCH demodulation performance when using a single PBCH TTI can be approximately 3.8 dB for CE Mode A UEs. In some aspects, one or more of the techniques disclosed herein can be used to achieve such performance gap in PBCH demodulation.

Referring to FIG. 7, there is illustrated a frame portion 700, which can be used for communicating PBCH symbols (i.e., MIB information) in an eMTC communication environment. More specifically, the frame portion 700 can include two subframes communicated using one PRB. As seen in FIG. 7, legacy PBCH symbols can be communicated within four symbols indicated as R0 within subframe (SF) 0, and repetitions of the for legacy PBCH symbols (R1-R4) can be communicated within SF9.

Figure 8:
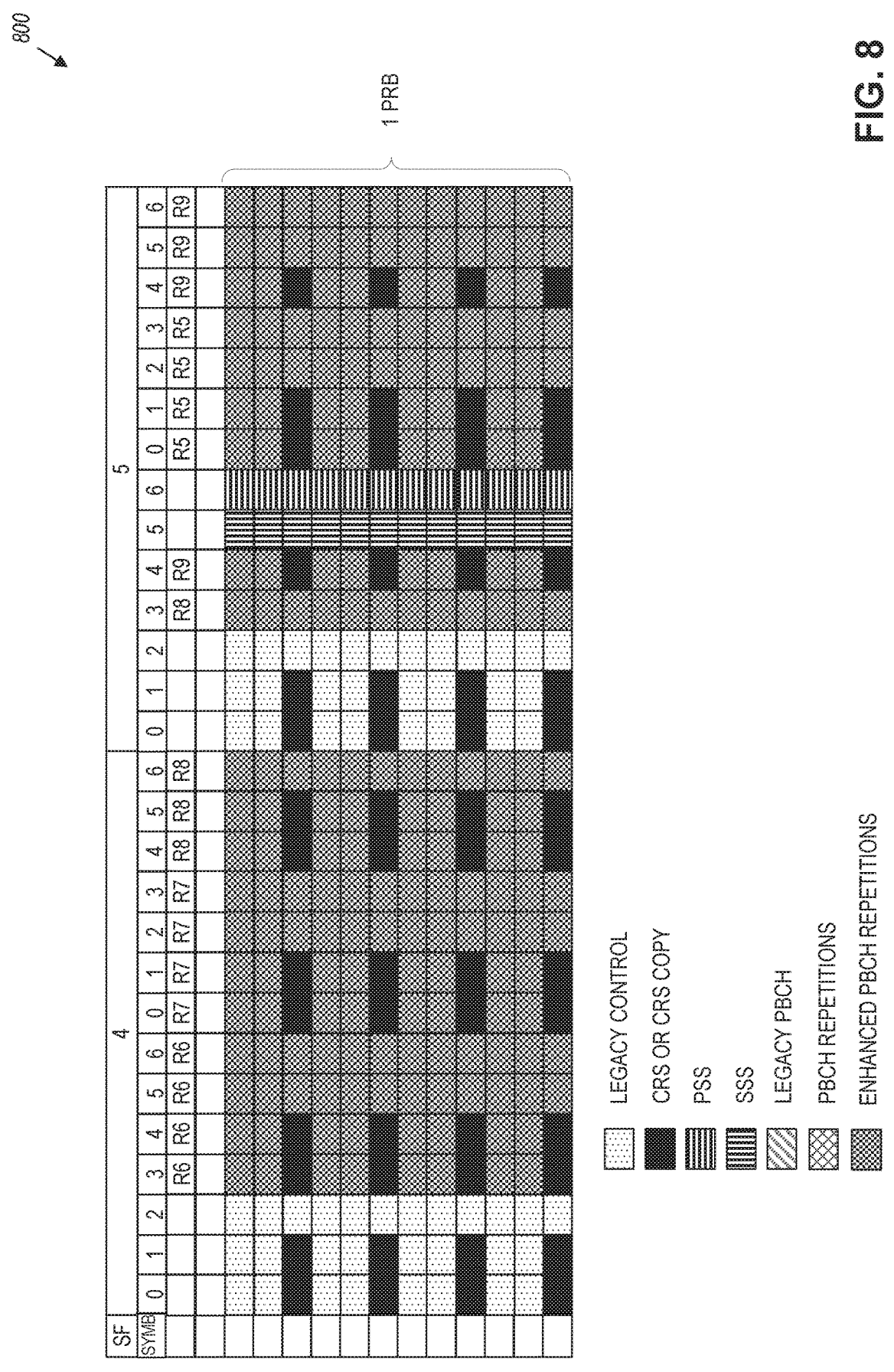

FIG. 8 illustrates an example downlink frame portion 800 for communicating PBCH symbols with enhanced PBCH repetitions, in accordance with some aspects.

In some aspects, in order to alleviate the performance gap in PBCH demodulation and achieve approximately 3 dB SNR improvement, the total number of PBCH symbols available to a UE (e.g., FeMTC UE) can be increased by additional (or enhanced) PBCH symbol repetitions. These symbols can be added as additional repetitions of the legacy PBCH symbols in the center 6 PRBs of other subframes. Since SF4 carries the SIB1-BR, repetitions of PBCH may be added to SF4 and SF5 for a system bandwidth (SBW) greater than 3 MHz.

Referring to FIG. 8, there is illustrated a frame portion 800 including SF4 and SF5. The enhanced PBCH repetitions of each of the four legacy PBCH symbols are indicated as R5-R9, spread between SF4 and SF5. In this regard, the UE receives 10 copies (R0-R9) of the four legacy PBCH symbols within every frame.

Even though FIG. 8 illustrates a single PRB (i.e., 12 carriers), additional five PRBs similar to the PRB illustrated in FIG. 8 can also be received, for a total of six PRBs.

Even though FIG. 8 illustrates enhanced PBCH repetitions in SF4 and SF5, other subframes can also be used to carry the enhanced PBCH repetitions.

Figure 9:
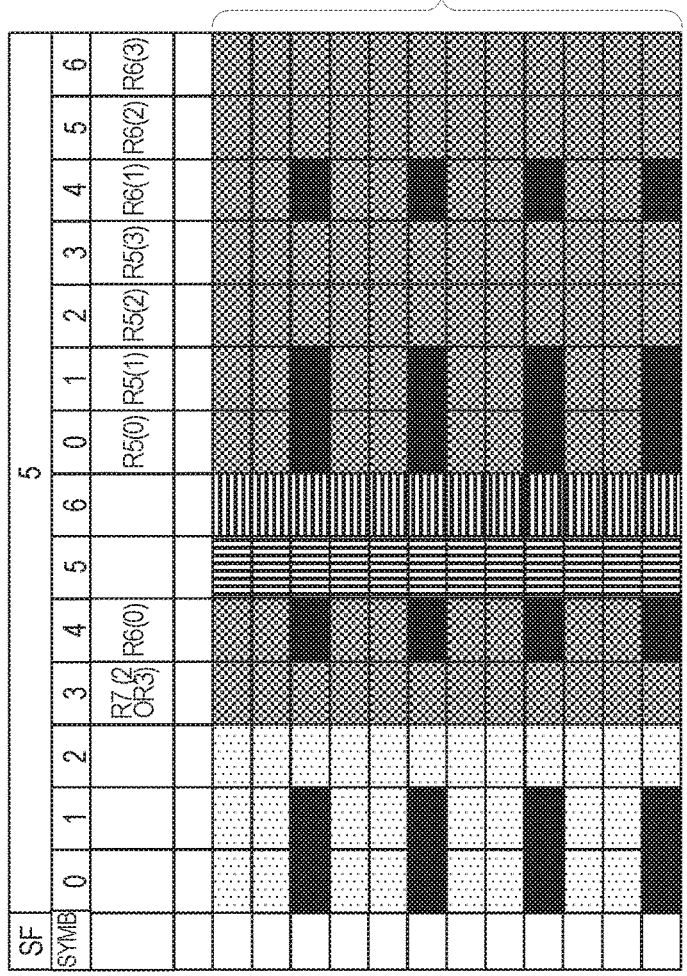
FIG. 9 illustrates another example downlink frame portion for communicating PBCH symbols with enhanced PBCH repetitions, in accordance with some aspects.

FIG. 9 illustrates another example downlink frame portion for communicating PBCH symbols with enhanced PBCH repetitions, in accordance with some aspects. Referring to FIG. 9, there is illustrated a downlink frame portion 900 which includes a single subframe (e.g., SF5). In instances when the system bandwidth is smaller than or equal to 3 MHz, PBCH repetitions may be added to a single subframe, such as SF5 as seen in NG. 9 (the number in parentheses after the repetition index Rx indicate the relative symbol index within a set of core PBCH symbols).

In some aspects, a single subframe (such as SF) can be used for the enhanced PBCH repetitions for all system bandwidth options, without restricting PBCH repetitions to different frames based on the system bandwidth.

In some aspects, the techniques described in connection to FIG. 8 and FIG. 9 can be applicable to 3GPP Release 14 FeMTC UEs that are capable of receiving larger bandwidth than 1.4 MHz (6 PRBs). In this case, the enhanced PBCH repetitions may be distributed both in time and in frequency. For example, PBCH repetitions may be mapped to SF9 and SF0 utilizing PRBs outside of the center 6 PRBs or to other subframes utilizing PRBs at any frequency within the supported bandwidth of Release 14 FeMTC UEs with larger bandwidth processing capability.

One of the challenges of extending PBCH in frequency domain is that MIB carries information defining the system bandwidth. In this regard, before a UE reads the MIB it may not be configured to determine that the cell has more than 1.4 MHz system bandwidth. In order to extend PBCH transmission in frequency domain, other techniques to overcome these challenges can be used. For example, one approach could be to allow the UE to detect the system bandwidth using cell specific reference signals (CRS) presence detection independent of the PBCH reading (e.g., UE detects CRS signals presence in a bandwidth, and in instances when the UE estimates that the bandwidth is greater than 1.4 MHz, it may proceed with PBCH decoding in larger bandwidths, outside of the center six PRBs). Alternatively, the UE may be configured to use several parallel PBCH decoding hypotheses (e.g., one hypothesis for 1.4 MHz bandwidth PBCH and another hypothesis for the extended bandwidth).

In some aspects, rate-matching and mapping to resource elements (REs) can be different from core PBCH symbols. As an example, the encoded bits can be rate matched to occupy the available REs (excluding first three symbols and UE CRS locations) spanning N PRBs, where N can be an integer selected from the set {2, 3, 4, 6}.

In some aspects, the above-described techniques for PBCH repetitions may be applicable to non-Category M1 UEs that support coverage enhancement features (for example, Category 1 UE that supports CE Mode A). In such aspects, the enhanced PBCH repetitions may be mapped to subframes and PRBs as indicated above (e.g., in connection with FIGS. 8-9) or to any subframes and any PRBs within the system bandwidth.

Figure 10:
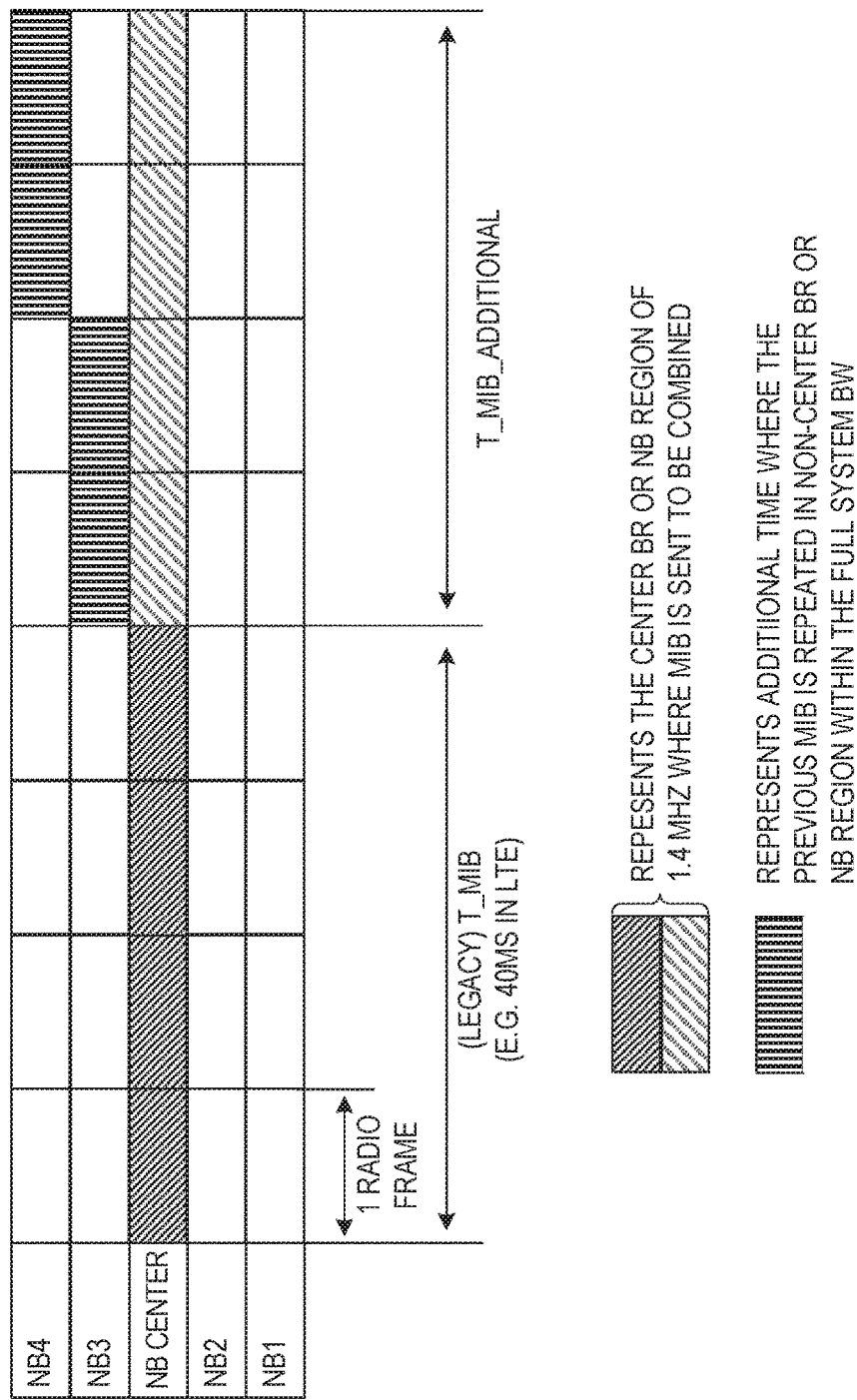
FIG. 10 illustrates an example downlink frame portion for communicating PBCH symbols with enhanced PBCH repetitions in different narrowbands (NBs), in accordance with some aspects.

FIG. 10 illustrates an example downlink frame portion for communicating PBCH symbols with enhanced PBCH repetitions in different narrowbands (NBs), in accordance with some aspects. Referring to FIG. 10, there is illustrated a transmission sequence 1000 which can include multiple NBs. More specifically, a UE can be configured to receive and transmit in more than one NBs, where a single NB can include six PRBs. As seen in FIG. 10, legacy PBCH transmission and reception can take place using the center six PRBs associated with NB_CENTER (e.g., the time T_MIB to receive legacy PBCH symbols can be 40 ms in LTE systems).

In some aspects, additional repetitions of the MIB can be scheduled in different bandwidth reduced (BR) or narrowband (NB) frames, other than the center PRBs (e.g., NB_CENTER) after the period where legacy MIB is sent (which is shown as legacy T_MIB in FIG. 10). The additional PBCH repetitions can be sent in non-center BR or NB within other resources (e.g., PDSCH resources), such as the T_MIB_ADDITIONAL duration illustrated in FIG. 10. In some aspects, the MIB repetitions can carry the same SFN as the one sent previously.

In some aspects when the additional PBCH transmissions use BR or NB resources outside of the center six PRBs, the UE can take longer to decode the MIB and, therefore, the network may need to guarantee that the scheduling information associated with SIB1-BR is still valid after decoding the MIR (i.e. after the T_MIB+T_MIB_ADDITIONAL time).

In some aspects, the information of the additional MIB repetitions (e.g., the T_MIB_ADDITIONAL time and frequency or NB or BR region) can be defined in specification or can be provided by the network, e.g. via broadcast or dedicated signaling. Such signaling may be helpful in communicating the MIB repetition-related information for a target eNB during the handover).

In some aspects related to a UE in idle mode, it can be assumed that the UE is configured to acquire the MIB based on the repetitions sent only within the center BR or NB after certain retries. Alternatively, the UE can be configured to receive the needed information from another cell (e.g., via new neighboring cell reselection information where the UEs provided information indicating that additional repetitions of MIB are enabled). Similarly, connected UEs can be configured to obtain the information associated with the additional MIB locations via dedicated or broadcast signaling.

FIG. 11 illustrates an example downlink frame portion for communicating PBCH symbols with enhanced PBCH repetitions in a time division duplex (TDD) communication system, in accordance with some aspects. Referring to FIG. 11, there is illustrated a frame portion 1100 which can be used in FeMTC networks operating in time division duplex (TDD). In some aspects, the additional repetitions of PBCH symbols can be provided in SF9, as illustrated in FIG. 11. In some aspects, the additional repetitions of PBCH symbols illustrated in FIG. 11, can be applicable to multiple TDD configurations except config 0. In some aspects, additional PBCH repetitions can be provided in other subframes, such as SF1, for special subframe configurations with Downlink Pilot Timeslot (DwPTS) spanning at least nine symbols, which can be applicable to all TDD configurations.

In some aspects, the techniques described herein (e.g., in connection with FIG. 7-FIG. 11) for informing the UE that additional resources are available may be either defined in a 3GPP specification (e.g., as a Release 14 requirement or a requirement for a later release) or as a parameter signaled by the higher layers in the system information block (SIB). In the case of the latter mechanism, the UE may be configured to utilize the enhanced PBCH repetitions for procedures other than initial cell access.

In some aspects, a UE can be configured to follow Release 13 behavior, whereby the presence of additional repetitions of PBCH is considered as a long-term property of the cell. More specifically, while the configuration of additional repetitions can be dependent on network implementation, once the UE detects presence of additional repetitions, the UE may assume the same configuration can be valid for subsequent reacquisition attempts.

In some aspects, in instances when the UE is in an Idle state, RRM procedures for eMTC can be used by the UE to obtain both the MIB and SIB1-BR in instances when system information (SI) is required (except handover). Thus, a reduction of SIB1-BR acquisition latency can lead to overall latency performance improvement for idle mobility scenarios, such as cell re-selection, paging interruption, and RRC re-establishment.

In some aspects, additional determinations related to whether the UE is expected to re-acquire the MIB when the UE does not acquire the SIB1-BR before the end of the SIB1-BR modification period (e.g., as is possible with UEs in CE Mode B) can be used to optimize the SIB1-BR acquisition latency. More specifically, the SIB1-BR acquisition latency can be optimized via, e.g., network configuration. In instances when the network is configured to maintain a persistent (i.e., several tens of seconds) scheduling configuration of the SIB1-BR in the MIB contents, the UE may not be required to re-acquire the MIB in those situations when it does not acquire the SIB1-BR before the end of the SIB1-BR modification period.

In some aspects, the SIB1-BR acquisition latency can be optimized via, e.g., 3GPP specification provision, e.g., by defining a persistence setting for the SIB1-BR scheduling information in the MIB such that the network is not allowed to change the SIB1-BR scheduling information over a sufficiently long (e.g., several tens of seconds) time period. One potential approach of implementing this solution in a RAN2 specification is including an indication of a bandwidth-limited (BL) or enhanced coverage (EC) UE that requires accumulating copies of SIB1-BR after 80 ms and that could continue without having to re-acquire the MIB (assuming that the network will keep the same content of the scheduling information for SIB1-BR in MIB to give the UE the time needed to be able to combine SIB1 for more than 80 ms).

In some aspects associated with NB-IoT UEs and eNB-IoT UEs (including Category NB1 UEs), SNR conditions for coverage extension scenarios can be approximately −6 dB for normal coverage (NC) and −12 dB for enhanced coverage (EC) UEs. In this regard, the NC target can be challenging to achieve when decoding NPBCH using a single TTI, and multiple TTIs may be needed.

In some aspects, a SNR to achieve 1% error rate in NPBCH decoding using a single PBCH TTI can be approximately −2.0 dB, In this regard, the performance gap in NPBCH demodulation performance, when using a single NPBCH TTI, can be approximately 4 dB for NC and 10 dB for EC UEs. In some aspects, these gaps can be used as performance targets of techniques disclosed herein.

Figure 12:
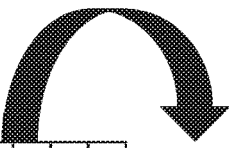
FIG. 12 illustrates an example downlink frame portion for communicating narrowband physical broadcast channel (NPBCH) symbols.

FIG. 12 illustrates an example downlink frame portion for communicating narrowband physical broadcast channel (NPBCH) symbols. Referring to FIG. 12, there is illustrated a frame sequence 1200 in connection with a narrowband IoT communication system. As seen in FIG. 12, the following information can be transmitted in multiple frames: a narrowband reference signal (NRS), a narrowband primary synchronization signal (NPSS), a narrowband secondary synchronization signal (NSSS), a narrowband PBCH (NPBCH) which is used to communicate the MIB, and SIB information such as SIB1-NB information. In some aspects, the NPBCH symbols can be transmitted in SFC and multiple frames.

Figure 13:
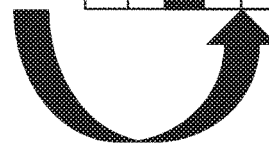
FIG. 13 illustrates an example downlink frame portion for communicating NPBCH symbols with enhanced NPBCH repetitions, in accordance with some aspects.

FIG. 13 illustrates an example downlink frame portion for communicating NPBCH symbols with enhanced NPBCH repetitions, in accordance with some aspects. Referring to FIG. 13, there is illustrated a frame sequence 1300 in connection with a narrowband IoT communication system using enhanced transmission of NPBCH symbols.

In some aspects, in order to achieve the SNR improvement of approximately 3 dB for NC UEs, the total number of NPBCH symbols available to a potentially enhanced NB-IoT UE can be increased (e.g., doubled). The NPBCH symbols can be added as additional repetitions of the 3GPP Release 13 (legacy) NPBCH symbols in the same carrier where NPBCH symbols are transmitted but in different subframes. For example and as seen in FIG. 13, the enhanced NPBCH repetitions can be added to SF4 with the same frame modulus as defined for NPBCH in Release 13 NB-IoT (e.g., the NPBCH repetitions can be added in odd-numbered frames). In some aspects, subframes other than SF4 may be used. In other aspects, the enhanced repetitions of PBCH symbols can be placed in SF9, as illustrated in FIG. 14.

Figure 14:
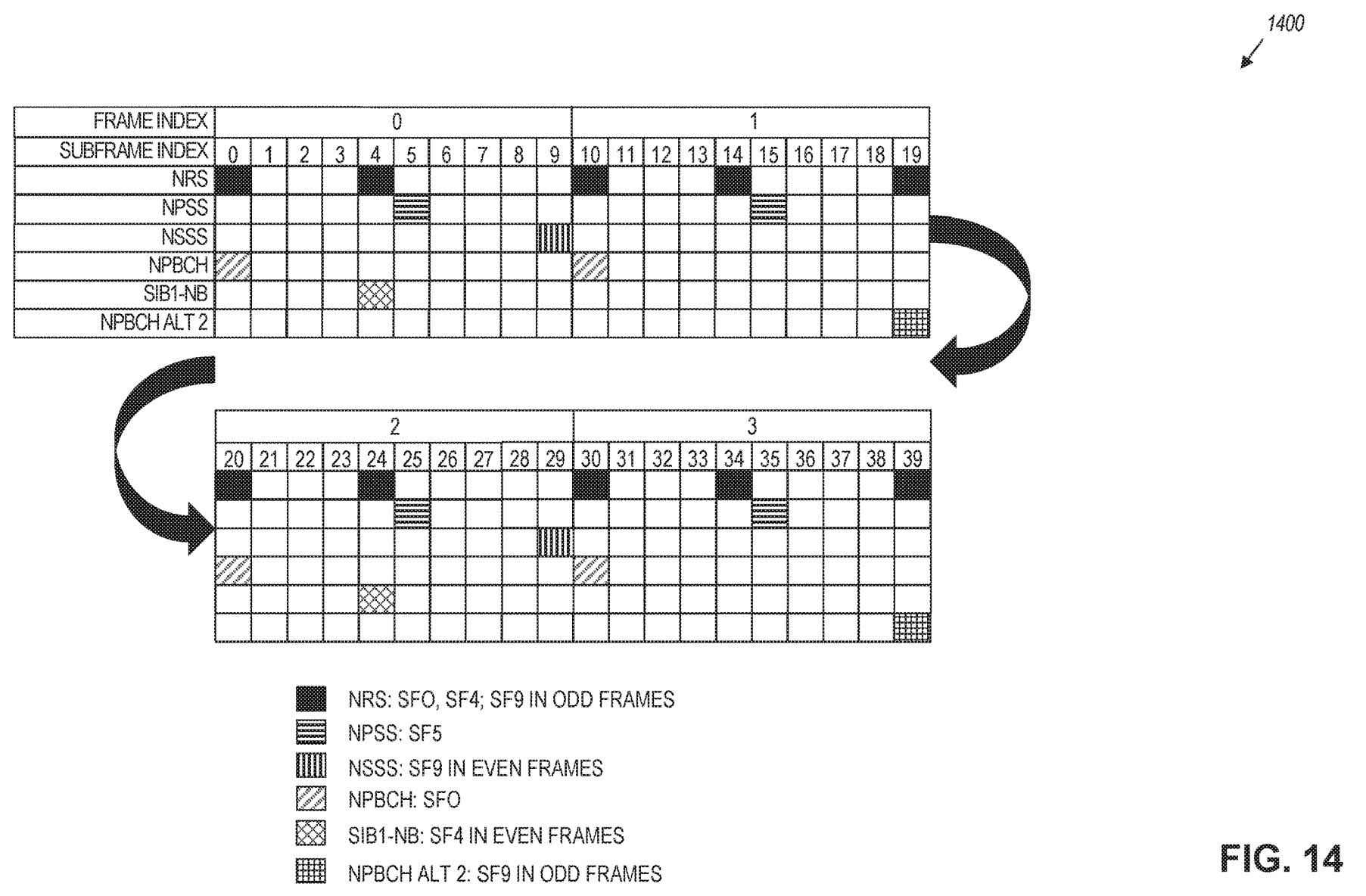

FIG. 14 illustrates another example downlink frame portion for communicating NPBCH symbols with enhanced NPBCH repetitions, in accordance with some aspects. Referring to FIG. 14, there is illustrated a frame sequence 1400 in connection with a narrowband IoT communication system using enhanced transmission of NPBCH symbols. As seen in FIG. 14, the NPBCH repetitions can be placed in SF9 in odd-numbered frames. Alternatively, other subframes can be used as well for communicating the NPBCH repetitions.

Figure 15:
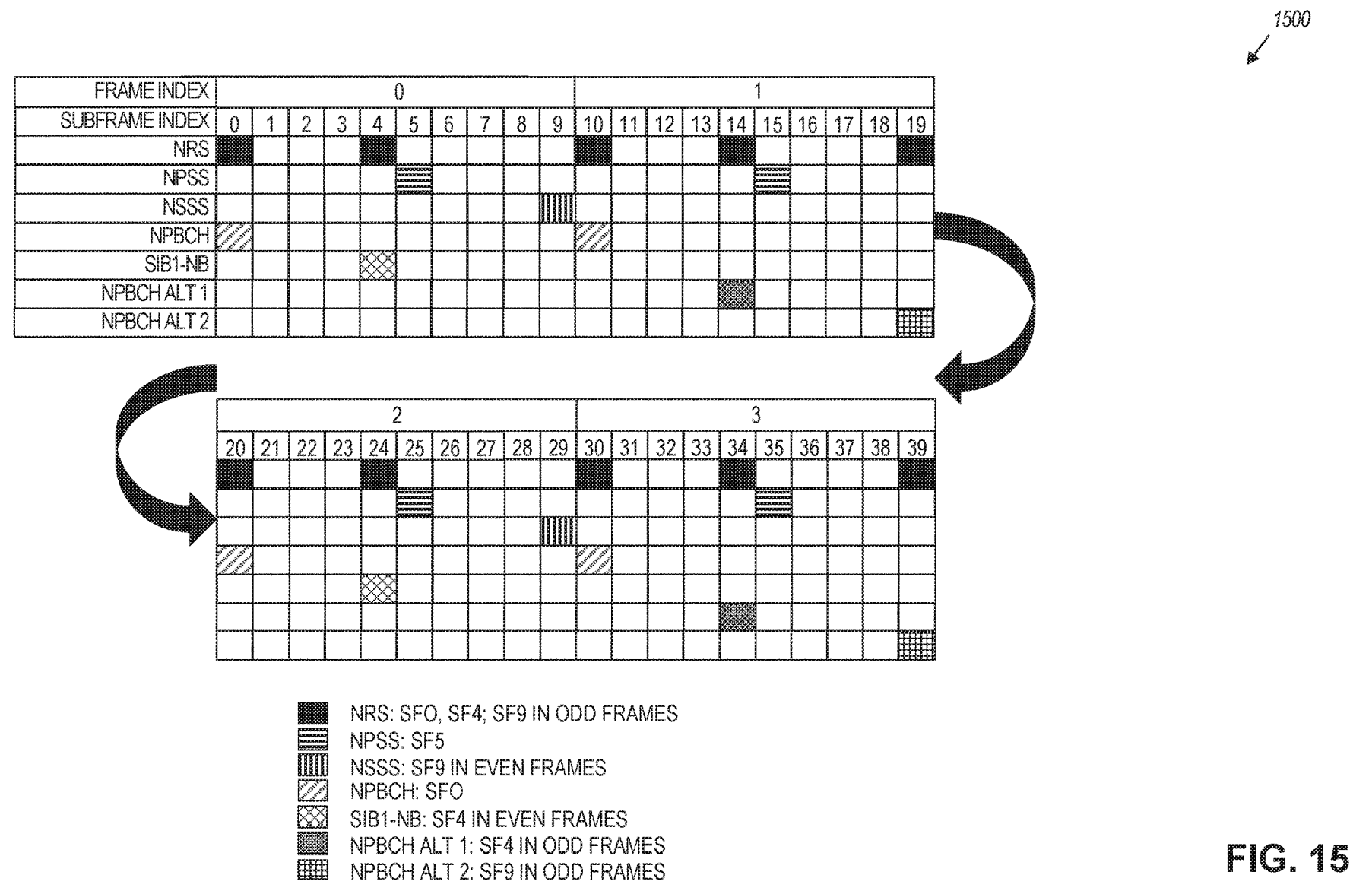

FIG. 15 illustrates yet another example downlink frame portion for communicating NPBCH symbols with enhanced NPBCH repetitions, in accordance with some aspects. Referring to FIG. 15, there is illustrated a frame sequence 1500 in connection with a narrowband IoT communication system using enhanced transmission of NPBCH symbols. In some aspects, NPBCH repetitions in multiple subframes can be used, as seen in FIG. 15. More specifically, NPBCH repetitions can be used in subframes SF4 and SF9 in odd-numbered frames. Alternatively, other subframes may also be used for multiple NPBCH repetitions.

In some aspects, the mechanism of informing the UE that additional resources are available may be either defined in a 3GPP specification (e.g., as a Release 14 requirement or a requirement for a later release) or as a parameter signaled by the higher layers in the system information block (SIB) or other dedicated or broadcast signaling. In instances when the SIB is used, the UE may be required to utilize the enhanced PBCH repetitions for procedures other than initial cell access.

In some aspects, RRM procedures for NB-IoT UEs can specify that the UE is to obtain both the MIB and SIB1-NB in all cases when system information (SI) is required (except handover). Thus, a reduction of SIB1-NB acquisition latency can lead to overall latency performance improvement for idle mobility scenarios, such as cell re-selection, paging interruption, and RRC re-establishment.

In some aspects, information such as whether the UE is expected to re-acquire the MIB-NB in those situations where the UE does not acquire the SIB1-NB before the end of the SIB1-NB modification period (e.g., in connection with EC UEs) can be helpful in improving the SIB1-NB acquisition latency. In some aspects, the SIB1-NB acquisition latency can be optimized via a network configuration. In instances when the network is configured to maintain a persistent (i.e., several tens of seconds) scheduling configuration of the SIB1-NB in the MIB-NB contents, the UE may not be required to re-acquire the MIB-NB in those situations when it does not acquire the SIB1-NB before the end of the SIB1-NB modification period.

In some aspects, a persistence setting can be used for the SIB1-NB scheduling information in the MIB-NB such that the network is not allowed to change the SIB1-NB scheduling information over a sufficiently long (e.g., several tens of seconds) time period. In some aspects, an NB-IoT UE that requires accumulating copies of SIB1-NB after 640 ms can be configured to continue without having to re-acquire the MIB (assuming that the network will keep the same content of the scheduling information for the SIB1-NB in MIB to give the UE the time needed to be able to combine SIB1 for more than 640 ms).

Figure 16:
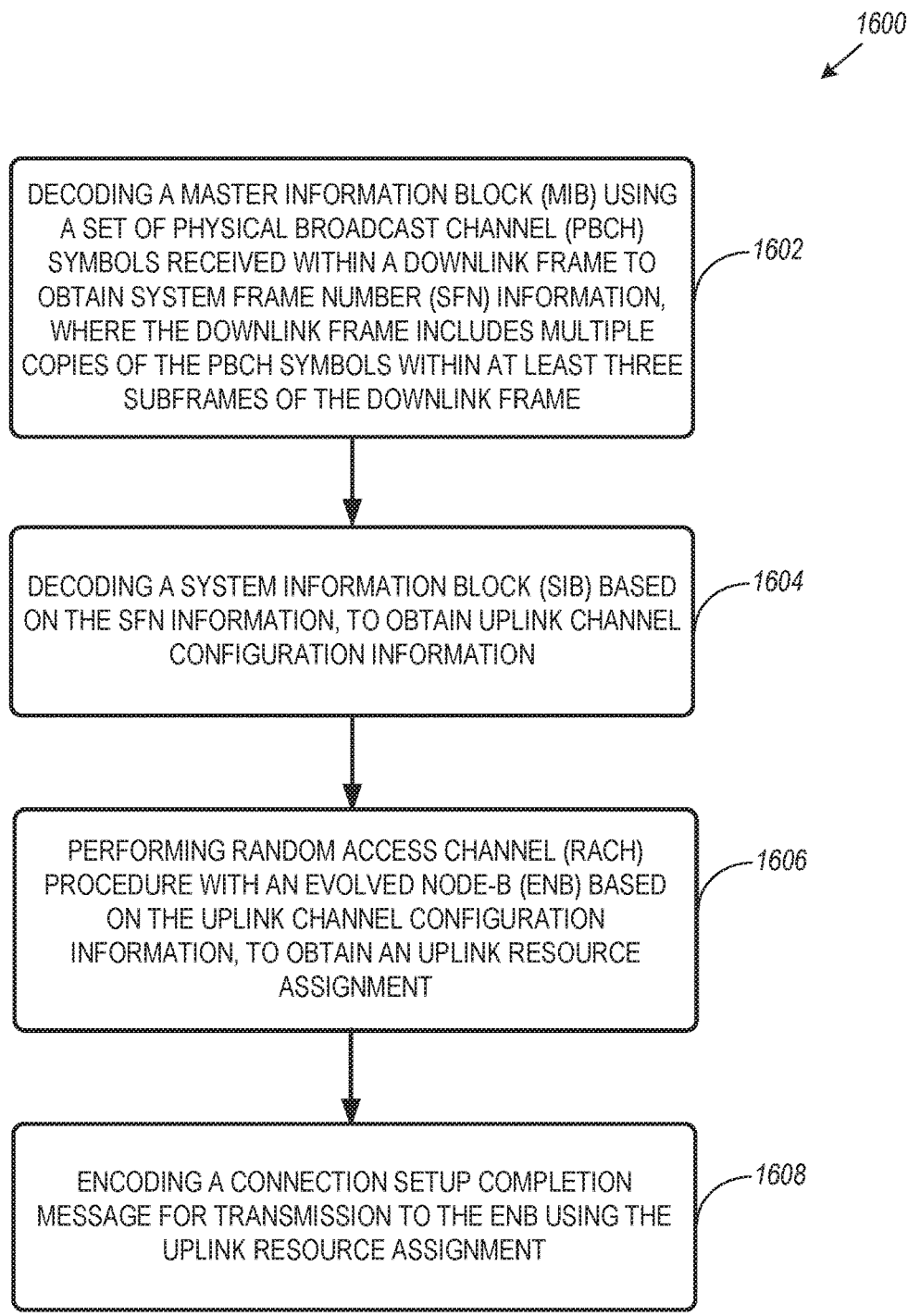
FIG. 16 illustrates generally a flowchart of an example method of operating a UE supporting PBCH enhancement functionalities, in accordance with some aspects.

FIG. 16 illustrates generally a flowchart of an example method of operating a UE supporting PBCH enhancement functionalities, in accordance with some aspects. Referring to FIG. 16, the example method 1600 may start at operation 1602. Master information block (MIB) (e.g., 190) can be decoded using a set of physical broadcast channel (PBCH) symbols (e.g., the enhanced PBCH repetitions as seen in FIG. 8) received within a downlink frame to obtain system frame number (SFN) information. The downlink frame can includes multiple copies of the PBCH symbols within at least three subframes of the downlink frame. For example, multiple repetitions (R0-R9) of the PBCH symbols can be used, as seen in FIGS. 7-8.

At operation 1604, the system information block (SIB) (e.g., SIB 192) can be decoded based on the SFN information, to obtain uplink channel configuration information. At operation 1606, a random access channel (RACH) procedure can be performed with a Base Station (BS), such as an evolved Node-B (eNB) or a Next Generation Node-B (gNB), based on the uplink channel configuration information, to obtain an uplink resource assignment. At operation 1608, a connection setup completion message can be encoded for transmission to the BS using the uplink resource assignment.

Figure 17:
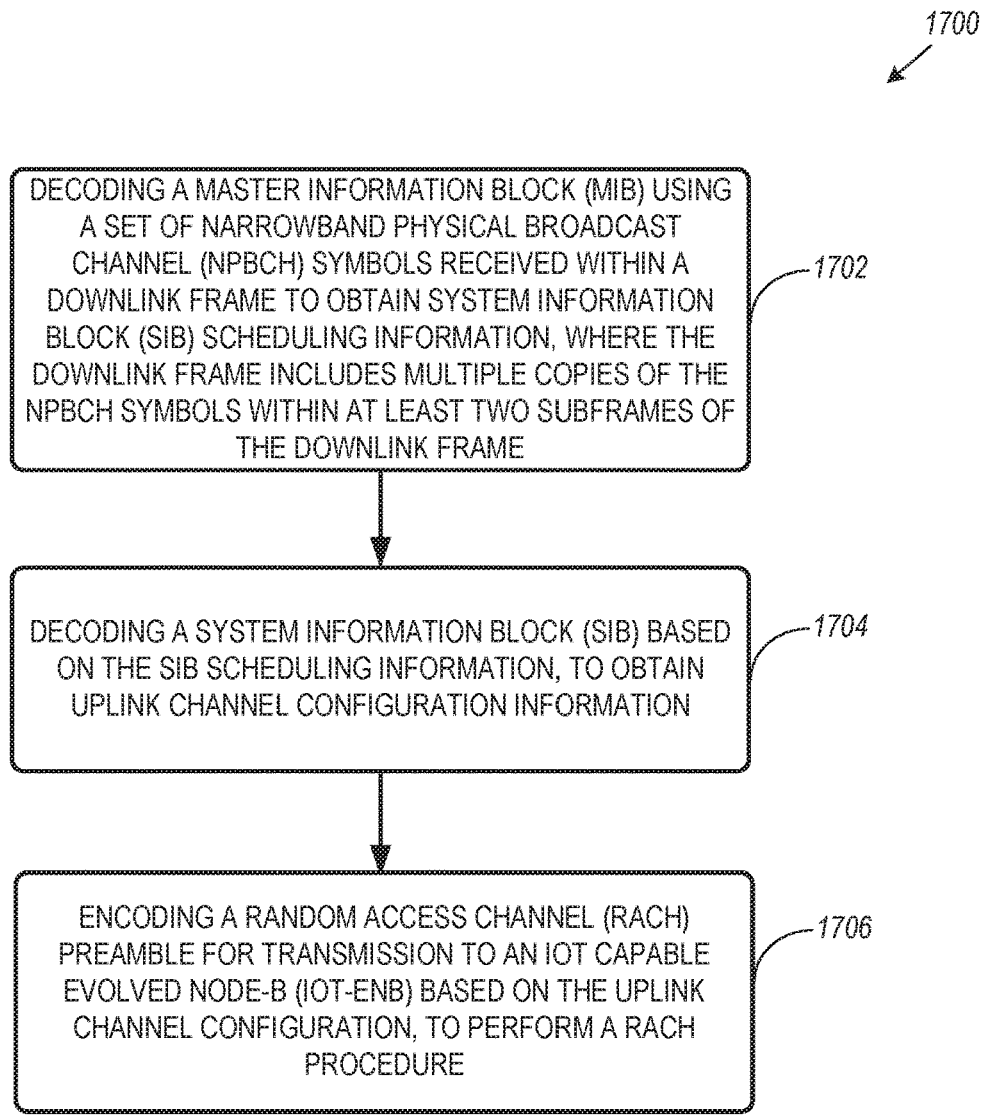
FIG. 17 illustrates generally a flowchart of an example method of operating a UE supporting NPBCH enhancement functionalities, in accordance with some aspects.

FIG. 17 illustrates generally a flowchart of an example method of operating a UE supporting NPBCH enhancement functionalities, in accordance with some aspects. Referring to FIG. 17, the example method 1700 may start at operation 1702. A master information block (MIB) can be decoded using a set of narrowband physical broadcast channel (NPBCH) symbols received within a downlink frame to obtain system information block (SIB) scheduling information. The downlink frame can include multiple copies of the NPBCH symbols within at least two subframes of the downlink frame. For example and as seen in FIG. 15, NPBCH repetitions can be used in multiple subframes within a single frame (e.g., SF4 and SF9 in a single odd-numbered frame).

At operation 1704, a system information block (SIB) can be decoded based on the SIB scheduling information, to obtain uplink channel configuration information. At operation 1706, a random access channel (RACH) preamble can be encoded for transmission to an IoT capable Base Station (IoT-BS), such as an evolved Node-B (IoT-eNB), based on the uplink channel configuration, to perform a RACH procedure.

Figure 18:
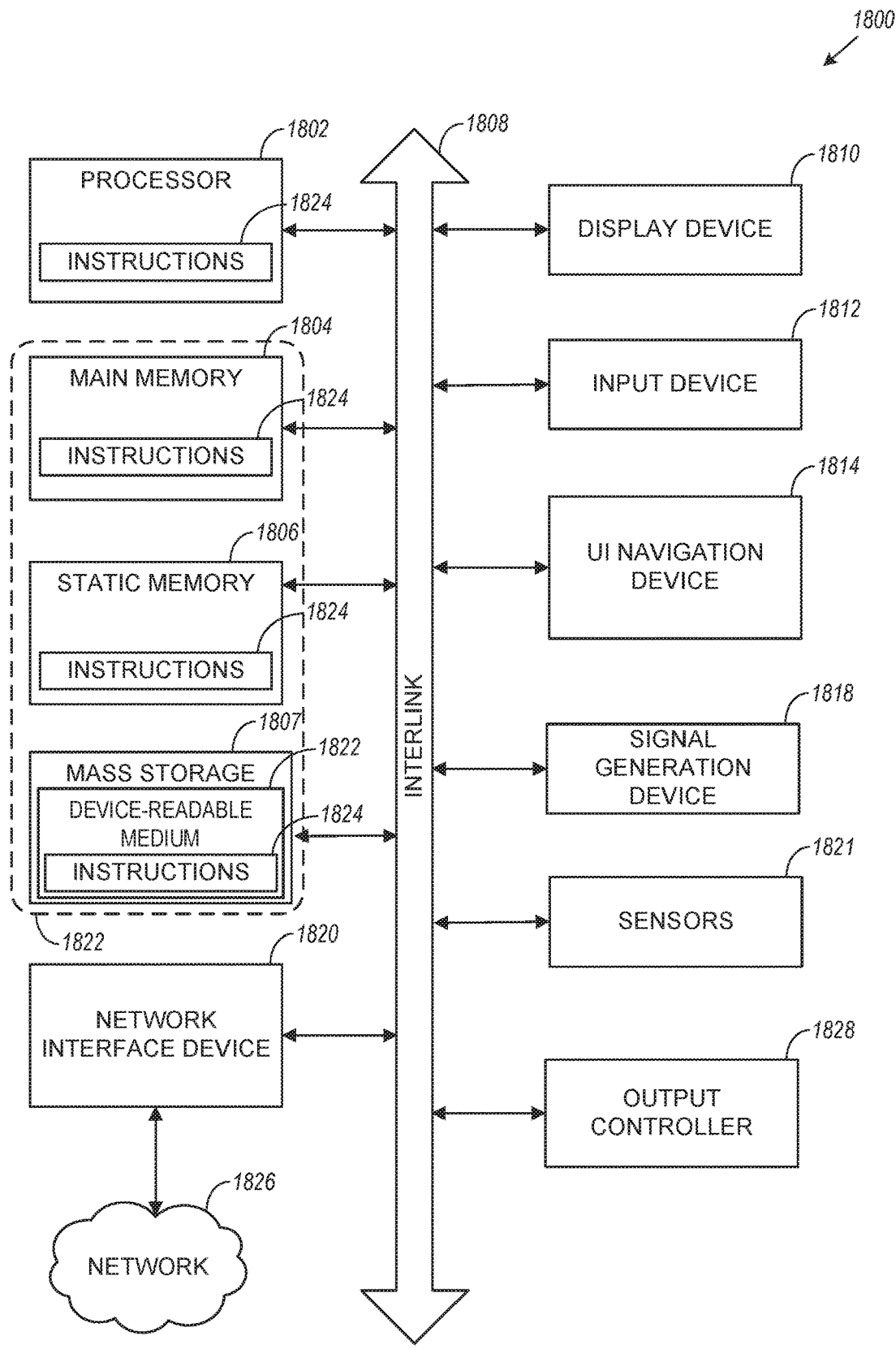
FIG. 18 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 18 illustrates a block diagram of a communication device such as an evolved Node-B (eNB), a new generation Node-B (gNB), an access point (AP), a wireless station (STA), a mobile station (MS), or a user equipment (UE), in accordance with some aspects. In alternative aspects, the communication device 1800 may operate as a standalone device or may be connected (e.g., networked) to other communication devices.

Circuitry (e.g., processing circuitry) is a collection of circuits implemented in tangible entities of the device 1800 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired).

In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 1800 follow.

In some aspects, the device 1800 may operate as a standalone device or may be connected (e.g., networked) to other devices. In a networked deployment, the communication device 1800 may operate in the capacity of a server communication device, a client communication device, or both in server-client network environments. In an example, the communication device 1800 may act as a peer communication device in peer-to-peer (P2P) (or other distributed) network environment. The communication device 1800 may be a UE, eNB, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., UE) 1800 may include a hardware processor 1802 (e.g., a central processing unit (CPU), a graphics processing unit (GPU), a hardware processor core, or any combination thereof), a main memory 1804, a static memory 1806, and mass storage 1807 (e.g., hard drive, tape drive, flash storage, or other block or storage devices), some or all of which may communicate with each other via an interlink (e.g., bus) 1808.

The communication device 1800 may further include a display device 1810, an alphanumeric input device 1812 (e.g., a keyboard), and a user interface (UI) navigation device 1814 (e.g., a mouse). In an example, the display device 1810, input device 1812 and UI navigation device 1814 may be a touch screen display. The communication device 1800 may additionally include a signal generation device 1818 (e.g., a speaker), a network interface device 1820, and one or more sensors 1821, such as a global positioning system (GPS) sensor, compass, accelerometer, or other sensor. The communication device 1800 may include an output controller 1828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1807 may include a communication device-readable medium 1822, on which is stored one or more sets of data structures or instructions 1824 (e.g., software) embodying or utilized by any one or more of the techniques or functions described herein. In some aspects, registers of the processor 1802, the main memory 1804, the static memory 1806, and/or the mass storage 1807 may be, or include (completely or at least partially), the device-readable medium 1822, on which is stored the one or more sets of data structures or instructions 1824, embodying or utilized by any one or more of the techniques or functions described herein. In an example, one or any combination of the hardware processor 1802, the main memory 1804, the static memory 1806, or the mass storage 1816 may constitute the device-readable medium 1822.

As used herein, the term "device-readable medium" is interchangeable with "computer-readable medium" or "machine-readable medium". While the communication device-readable medium 1822 is illustrated as a single medium, the term "communication device-readable medium" may include a single medium or multiple media (e.g., a centralized or distributed database, and/or associated caches and servers) configured to store the one or more instructions 1824.

The term "communication device-readable medium" may include any medium that is capable of storing, encoding, or carrying instructions (e.g., instructions 1824) for execution by the communication device 1800 and that cause the communication device 1800 to perform any one or more of the techniques of the present disclosure, or that is capable of storing, encoding or carrying data structures used by or associated with such instructions. Non-limiting communication device-readable medium examples may include solid-state memories, and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 1824 may further be transmitted or received over a communications network 1826 using a transmission medium via the network interface device 1820 utilizing any one of a number of transfer protocols (e.g., frame relay, Internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1820 may include one or more physical jacks (e.g., Ethernet, coaxial, or phone jacks) or one or more antennas to connect to the communications network 1826. In an example, the network interface device 1820 may include a plurality of antennas to wirelessly communicate using at least one of single-input multiple-output (SIMO), MEMO, or multiple-input single-output (MISO) techniques. In some examples, the network interface device 1820 may wirelessly communicate using Multiple User MIMO techniques.

The term "transmission medium" shall be taken to include any intangible medium that is capable of storing, encoding or carrying instructions for execution by the communication device 1800, and includes digital or analog communications signals or other intangible medium to facilitate communication of such software. In this regard, a transmission medium in the context of this disclosure is a device-readable medium.

ADDITIONAL NOTES AND EXAMPLES

Example 1 is an apparatus of a Machine Type Communication (MTC) capable user equipment (UE), the apparatus comprising: processing circuitry, the processing circuitry configured to: decode a master information block (MIB) using a set of physical broadcast channel (PBCH) symbols received within a downlink frame to obtain system frame number (SFN) information, wherein the downlink frame includes, multiple copies of the PBCH symbols within at least three subframes of the downlink frame; decode a system information block (SIB) based on the SFN information, to obtain uplink channel configuration information; perform random access channel (RACH) procedure with an evolved Node-B (eNB) based on the uplink channel configuration information, to obtain an uplink resource assignment; and encode a connection setup completion message for transmission to the eNB using the uplink resource assignment; and memory coupled to the processing circuitry, the memory configured to store the MIB.

In Example 2, the subject matter of Example 1 includes, wherein the set of PBCH symbols comprise a set of four legacy PBCH symbols.

In Example 3, the subject matter of Examples 1-2 includes, wherein the copies of the PBCH symbols are located within a set of central six physical resource blocks (PRBs) of the at least three subframes, and wherein the central six PRBs form the center PRBs of a system bandwidth.

In Example 4, the subject matter of Example 3 includes, wherein the set of central six PRBs have a bandwidth of 1.4 MHz.

In Example 5, the subject matter of Examples 3-4 includes, wherein the at least three subframes include subframe 4 and subframe 5 of the downlink frame, the downlink frame including subframes numbered from 0 to 9.

In Example 6, the subject matter of Examples 3-5 includes, wherein the at least three subframes include subframe 5 and subframe 9 of the downlink frame, the downlink frame including subframes numbered from 0 to 9.

In Example 7, the subject matter of Examples 1-6 includes, wherein the multiple copies of the PBCH symbols are distributed in time and in frequency when received from the eNB.

In Example 8, the subject matter of Examples 1-7 includes, wherein the multiple copies of the PBCH symbols include a set of legacy symbols received in a center narrow band (NB) of a system bandwidth, and multiple copies of the legacy PBCH symbols received in a non-center NB of the system bandwidth.

In Example 9, the subject matter of Examples 1-8 includes, wherein the processing circuitry is further configured to: detect presence of a cell specific reference signal (CRS) within a plurality of physical resource blocks (PRBs) of a received signal; and determine a system bandwidth based on the location of the CRS within the plurality of PRBs.

In Example 10, the subject matter of Example 9 includes, wherein when the system bandwidth is greater than 1.4 MHz, the processing circuitry is configured to: detect the multiple copies of the PBCH symbols outside of a set of central six PRBs of the plurality of PRBs.

In Example 11, the subject matter of Examples 9-10 includes, wherein when the system bandwidth is 1.41 MHz, the processing circuitry is configured to: detect the multiple copies of the PBCH symbols within a set of central six PRBs of the plurality of PRBs.

In Example 12, the subject matter of Examples 1-11 includes, wherein the processing circuitry is further configured to: decode signalling indicating locations of the multiple copies of the PBCH symbols within physical resource blocks (PRBs) of the downlink frame.

In Example 13, the subject matter of Example 12 includes, wherein the signalling is one of dedicated signalling or broadcast signalling.

In Example 14, the subject matter of Examples 1-13 includes, wherein the SIB is a system information block 1 with bandwidth reduction (SIB1-BR).

In Example 15, the subject matter of Example 14 includes, wherein the processing circuitry is further configured to: decode signaling indicating persistent scheduling configuration for the SIB1-BR.

In Example 16, the subject matter of Examples 1-15 includes, transceiver circuitry coupled to the processing circuitry; and, one or more antennas coupled to the transceiver circuitry.

Example 17 is an apparatus of an Evolved Node-B (eNB), the apparatus comprising: processing circuitry, configured to: encode system frame number (SFN) information within a master information block (MIB) using a set of physical broadcast channel (PBCH) symbols for transmission to a user equipment (UE) within a downlink frame, wherein the downlink frame includes, multiple copies of the PBCH symbols within at least two subframes of the downlink frame; encode uplink channel configuration information within a system information block (SIB) based on the SFN information; and perform random access channel (RACH) procedure with the UE based on the uplink channel configuration information, to grant an uplink resource assignment to the UE; and memory coupled to the processing circuitry, the memory configured to store the uplink channel configuration information.

In Example 18, the subject matter of Example 17 includes, wherein the UE is an Internet-of-Things (IoT) capable UE, and the set of PBCH symbols comprise a set of narrowband PBCH (NPBCH) legacy symbols.

In Example 19, the subject matter of Example 18 includes, wherein the processing circuitry is further configured to: encode the set of NPBCH legacy symbols within a first subframe of the downlink frame; and encode one or more copies of the set of NPBCH legacy symbols in at least a second subframe of the downlink frame.

In Example 20, the subject matter of Example 19 includes, wherein when the downlink frame is an odd numbered frame the first subframe is subframe 0 (SF0) and the at least second subframe is SF9 within the odd numbered frame, wherein the downlink frame includes subframes numbered from 0 to 9.

In Example 21, the subject matter of Examples 19-20 includes, wherein when the downlink frame is an odd numbered frame, the first subframe is SF0 and the at least second subframe is SF4 within the odd numbered frame wherein the downlink frame includes subframes numbered from 0 to 9.

In Example 22, the subject matter of Examples 17-21 includes, wherein the SIB is a narrowband system information block 1 (SIB1-NB).

In Example 23, the subject matter of Example 22 includes, wherein the processing circuitry is further configured to: encode signaling for transmission to the UE, the signalling indicating persistent scheduling configuration for the SIB1-NR.

In Example 24, the subject matter of Examples 17-23 includes, transceiver circuitry coupled to the processing circuitry; and, one or more antennas coupled to the transceiver circuitry.

Example 25 is a computer-readable storage medium that stores instructions for execution by one or more processors of an Internet-of-Things (IoT) capable user equipment (UE), the instructions to configure the one or more processors to cause the UE to: decode a master information block (MIB) using a set of narrowband physical broadcast channel (NPBCH) symbols received within a downlink frame to obtain system information block (SIB) scheduling information, wherein the downlink frame includes, multiple copies of the NPBCH symbols within at least two subframes of the downlink frame; decode a system information block (SIB) based on the SIB scheduling information, to obtain uplink channel configuration information; and encode a random access channel (RACH) preamble for transmission to an IoT capable evolved Node-B (IoT-eNB) based on the uplink channel configuration, to perform a RACH procedure.

In Example 26, the subject matter of Example 25 includes, wherein the instructions further configure the one or more processors to cause the UE to: decode the set of NPBCH symbols within a first subframe of the downlink frame; and decode one or more copies of the set of NPBCH symbols in at least a second subframe of the downlink frame.

In Example 27, the subject matter of Example 26 includes, wherein when the downlink frame is an odd numbered frame, the first subframe is subframe 0 (SF0) and the at least second subframe is SF9 within the odd numbered frame, wherein the downlink frame includes subframes numbered from 0 to 9.

In Example 28, the subject matter of Examples 26-27 includes, wherein when the downlink frame is an odd numbered frame, the first subframe is subframe 0 (SF0) and the at least second subframe is SF4 within the odd numbered frame, wherein the downlink frame includes subframes numbered from 0 to 9.

In Example 29, the subject matter of Examples 25-28 includes, wherein the SIB is a narrowband system information block 1 (SIB1-NB).

In Example 30, the subject matter of Example 29 includes, wherein the instructions further configure the one or more processors to cause the UE to: decode signaling from the IoT-eNB, the signalling indicating persistent scheduling configuration for the SIB1-NR.

Example 31 is at least one machine-readable medium including instructions that, when executed by processing circuitry, cause the processing circuitry to perform operations to implement of any of Examples 1-30.

Example 32 is an apparatus comprising means to implement of any of Examples 1-30.

Example 33 is a system to implement of any of Examples 1-30.

Example 34 is a method to implement of any of Examples 1-30.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects, and other aspects not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus the following claims are hereby incorporated into the Detailed Description, with each claim standing on its own as a separate aspect.

What is claimed is:

1. An apparatus comprising:
   at least one processor configured to cause a user equipment (UE) to:
   decode a master information block (MIB) using a set of physical broadcast channel (PBCH) symbols received within a downlink frame to obtain system frame number (SFN) information, wherein the downlink frame includes multiple copies of the PBCH symbols within at least three subframes of the downlink frame;
   decode signaling indicating persistent scheduling configuration, wherein the Persistent scheduling configuration indicates system information block 1 with bandwidth reduction (SIB1-BR) scheduling information does not change for at least 640 ms;
   decode the SIB1-BR based on the SFN information and the persistent scheduling configuration, to obtain uplink channel configuration information;
   perform random access channel (RACH) procedure with an evolved Node-B (eNB) based on the uplink channel configuration information, to obtain an uplink resource assignment; and
   encode a connection setup completion message for transmission to the eNB using the uplink resource assignment.

2. The apparatus of claim 1, wherein the set of PBCH symbols comprise a set of four legacy PBCH symbols.

3. The apparatus of claim 1, wherein the copies of the PBCH symbols are located within a set of central six physical resource blocks (PRBs) of the at least three subframes, and wherein the central six PRBs form the center PRBs of a system bandwidth.

4. The apparatus of claim 3, wherein the set of central six PRBs have a bandwidth of 1.4 MHz.

5. The apparatus of claim 3, wherein the at least three subframes include subframe 4 and subframe 5 of the downlink frame, the downlink frame including subframes numbered from 0 to 9.

6. The apparatus of claim 3, wherein the at least three subframes include subframe 5 and subframe 9 of the downlink frame, the downlink frame including subframes numbered from 0 to 9.

7. The apparatus of claim 1, wherein the multiple copies of the PBCH symbols are distributed in time and in frequency when received from the eNB.

8. The apparatus of claim 1, wherein the multiple copies of the PBCH symbols include a set of legacy PBCH symbols received in a center narrow band (NB) of a system bandwidth, and multiple copies of the legacy PBCH symbols received in a non-center NB of the system bandwidth.

9. The apparatus of claim 1, wherein the at least one processor is further configured to:
   detect presence of a cell specific reference signal (CRS) within a plurality of physical resource blocks (PRBs) of a received signal; and
   determine a system bandwidth based on the location of the CRS within the plurality of PRBs.

10. The apparatus of claim 9, wherein when the system bandwidth is greater than 1.4 MHz, the at least one processor is configured to:
    detect the multiple copies of the PBCH symbols outside of a set of central six PRBs of the plurality of PRBs.

11. The apparatus of claim 9, wherein when the system band width is 1.4 MHz, the at least one processor is configured to:
    detect the multiple copies of the PBCH symbols within a set of central six PRBs of the plurality of PRB s.

12. The apparatus of claim 1, wherein the at least one processor is further configured to:
    decode signalling indicating locations of the multiple copies of the PBCH symbols within physical resource blocks (PRBs) of the downlink frame.

13. The apparatus of claim 12, wherein the signalling is one of dedicated signalling or broadcast signalling.

14. The apparatus of claim 1, further comprising transceiver circuitry coupled to the at least one processor; and, one or more antennas coupled to the transceiver circuitry.

15. An apparatus comprising:
    at least one processor, configured to cause a base station to:
    encode system frame number (SFN) information within a master information block (MIB) using a set of physical broadcast channel (PBCH) symbols for transmission to a user equipment (UE) within a downlink frame, wherein the downlink frame includes multiple copies of the PBCH symbols within at least two subframes of the downlink frame;
    encode signaling indicating persistent scheduling configuration, wherein the Persistent scheduling configuration indicates system information block 1 with bandwidth reduction (SIB1-BR) scheduling information does not change for at least 640 ms
    encode uplink channel configuration information within the SIB1-BR based on the SFN information and the persistent scheduling configuration; and
    perform random access channel (RACH) procedure with the UE based on the uplink channel configuration information, to grant an uplink resource assignment to the UE.

16. The apparatus of claim 15, wherein the UE is an Internet-of-Things (IoT) capable UE, and the set of PBCH symbols comprise a set of narrowband PBCH (NPBCH) legacy symbols.

17. A Internet-of-Things (IoT) capable user equipment (UE), comprising:
    wireless communication circuitry; and
    one or more processors coupled to the wireless communication circuitry, configured to cause the UE to:
    decode a master information block (MIB) using a set of narrowband physical broadcast channel (NPBCH) symbols received within a downlink frame to obtain system information block (SIB) scheduling information, wherein the downlink frame includes multiple copies of the (NPBCH) symbols within at least two subframes of the downlink frame;

decode signaling indicating persistent scheduling configuration, wherein the persistent scheduling configuration indicates system information block 1 with bandwidth reduction (SIB1-BR) scheduling information does not change for at least 640 ms;

decode the SIB1-BR based on the SIB scheduling information and the persistent scheduling configuration, to obtain uplink channel configuration information; and encode a random access channel (RACH) preamble for transmission to an IoT capable evolved Node-B (IoT-eNB) based on the uplink channel configuration, to perform a RACH procedure.

18. The UE of claim 17, wherein the one or more processors are further configured to cause the UE to:

decode the set of NPBCH symbols within a first subframe of the downlink frame; and decode one or more copies of the set of NPBCH symbols in at least a second subframe of the downlink frame.

19. The apparatus of claim 15, wherein the multiple copies of the PBCH symbols include a set of legacy PBCH symbols received in a center narrow band (NB) of a system bandwidth, and multiple copies of the legacy PBCH symbols received in a non-center NB of the system bandwidth.

20. The UE of claim 17, wherein the multiple copies of the NPBCH symbols include a set of legacy NPBCH symbols received in a center narrow band (NB) of a system bandwidth, and multiple copies of the legacy NPBCH symbols received in a non-center NB of the system bandwidth.

\* \* \* \* \*